US012671531B2

(12) United States Patent　　(10) Patent No.:　US 12,671,531 B2

Shim et al.　　(45) Date of Patent:　Jun. 30, 2026

(54) METHOD FOR TRANSMITTING/RECEIVING PUSCH IN WIRELESS COMMUNICATION SYSTEM, AND DEVICE THEREFOR

(71) Applicant: LG Electronics Inc., Seoul (KR)

(72) Inventors: Jaenam Shim, Seoul (KR); Hyunsoo Ko, Seoul (KR); Suckchel Yang, Seoul (KR); Hyangsun You, Seoul (KR); Seunggye Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 197 days.

(21) Appl. No.: 18/285,948

(22) PCT Filed: Apr. 6, 2022

(86) PCT No.: PCT/KR2022/004991

§ 371 (c)(1),
(2) Date: Oct. 6, 2023

(87) PCT Pub. No.: WO2022/216065

PCT Pub. Date: Oct. 13, 2022

(65) Prior Publication Data

US 2024/0195545 A1　　Jun. 13, 2024

(30) Foreign Application Priority Data

Apr. 6, 2021　　(KR) ........................ 10-2021-0044726
Jan. 11, 2022　　(KR) ........................ 10-2022-0004238

(51) Int. Cl.
H04L 5/00　　　　(2006.01)
H04L 25/02　　　(2006.01)
(Continued)

(52) U.S. Cl.
CPC .......... H04L 5/0012 (2013.01); H04L 5/0051 (2013.01); H04L 25/0228 (2013.01); H04W 72/232 (2023.01)

(58) Field of Classification Search
CPC .. H04W 72/232; H04L 5/0012; H04L 5/0051; H04L 25/0228
See application file for complete search history.

(56) References Cited

U.S. PATENT DOCUMENTS

2020/0052827 A1　　2/2020　Vilaipornsawai et al.
2022/0046670 A1*　2/2022　Lin ...................... H04L 5/0053
(Continued)

FOREIGN PATENT DOCUMENTS

EP　　　　4207919　A1　　7/2023
JP　　　2021-29010　A　　2/2021
WO　WO 2020067967　　　4/2020

OTHER PUBLICATIONS

Extended European Search Report in European Appln. No. 22784974.2, mailed on Mar. 14, 2025, 10 pages.
(Continued)

*Primary Examiner* — Ronald B Abelson

(74) *Attorney, Agent, or Firm* — Fish & Richardson P.C.

(57) ABSTRACT

The present specification presents a method for transmit-ting a PUCCH in a wireless communication system. A method performed by means of a terminal comprises the steps of: receiving, from a base station, configuration information about a time domain window; receiv-ing, from the base station, downlink control information (DCI) including scheduling information for a PUSCH and frequency hopping informa-tion for the PUSCH; transmitting the PUSCH to the base station at a first frequency hop having the same length as a first time domain window; and transmitting the PUSCH to the base station at a second frequency hop having the same length as a second time domain window.

12 Claims, 13 Drawing Sheets

(51) Int. Cl.
  *H04W 72/23*        (2023.01)
  *H04W 72/232*      (2023.01)

(56)           References Cited

U.S. PATENT DOCUMENTS

2022/0224456 A1*   7/2022   Yi ......................... H04L 1/1864
2022/0256572 A1*   8/2022   Kim ...................... H04W 72/23
2022/0353862 A1*  11/2022   Cozzo ............... H04W 72/0473
2024/0022384 A1*   1/2024   Liu ........................ H04B 1/713
2024/0179688 A1*   5/2024   Echigo ............. H04W 72/0446

OTHER PUBLICATIONS

Nokia, Nokia Shanghai Bell, "Joint channel estimation for PUSCH coverage enhancements," R1-2101712, 3GPP TSG RAN WG1 #104-e, e-Meeting, Jan. 25-Feb. 5, 2021, 5 pages.
Notice of Allowance in Japanese Appln. No. 2023-561899, mailed on Feb. 25, 2025, 4 pages (with English translation).
Office Action in Japanese Appln. No. 2023-561899, mailed on Oct. 1, 2024, 7 pages (with English translation).

Vivo, "TP on frequency hopping for NR-U configured grant," R1-2100409, 3GPP TSG RAN WG1 #104-e, e-Meeting, Jan. 25-Feb. 5, 2021, 5 pages.
ZTE Corporation, "Discussion on joint channel estimation for PUSCH," R1-2100097, 3GPP TSG RAN WG1 #104-e, e-Meeting, Jan. 25-Feb. 5, 2021, 7 pages.
ZTE Corporation, "Discussion on PUCCH coverage enhancement," R1-2100098, 3GPP TSG RAN WG1 #104-e, e-Meeting, Jan. 25-Feb. 5, 2021, 5 pages.
Lenovo, Motorola Mobility, "Enhancements on Multi-TRP for PDCCH, PUCCH and PUSCH," 3GPP TSG RAN WG1 #104-e, R1-2100274, e-Meeting, Jan. 25- Feb. 5, 2021, 17 pages.
Moderator (China Telecom), "[104-e-NR-CovEnh-03] Summary of email discussion on joint channel estimation for PUSCH," 3GPP TSG RAN WG1 Meeting #104-e, R1-2102161, E-Meeting, Jan. 25-Feb. 5, 2021, 94 pages.
Motorola Mobility, Lenovo, "Frequency hopping in PUSCH repetition," 3GPP TSG RAN WG1 Meeting #100-e, R1-2000902, e-Meeting, Feb. 24 -Mar. 6, 2020, 3 pages.
Vivo, "Discussion on Joint channel estimation for PUSCH," 3GPP TSG RAN WG1 #104-e, R1-2100459, e-Meeting, Jan. 25-Feb. 5, 2021, 6 pages.

* cited by examiner

FIG. 5

Resource grid

A carrier
(up to 3300 subcarriers, i.e., 275 RBs)

A BWP

1RB = 12 subcarriers 1 subcarrier

1 RE 1 symbol k=0 l=0 · · ·

FIG. 6

Antenna Port A⎱
Antenna Port B⎰Numerology X

Antenna Port A⎱
Antenna Port B⎰Numerology Y

PUSCH repetition type A (a) Nominal repetition (b) Actual repetition

Figure 12:
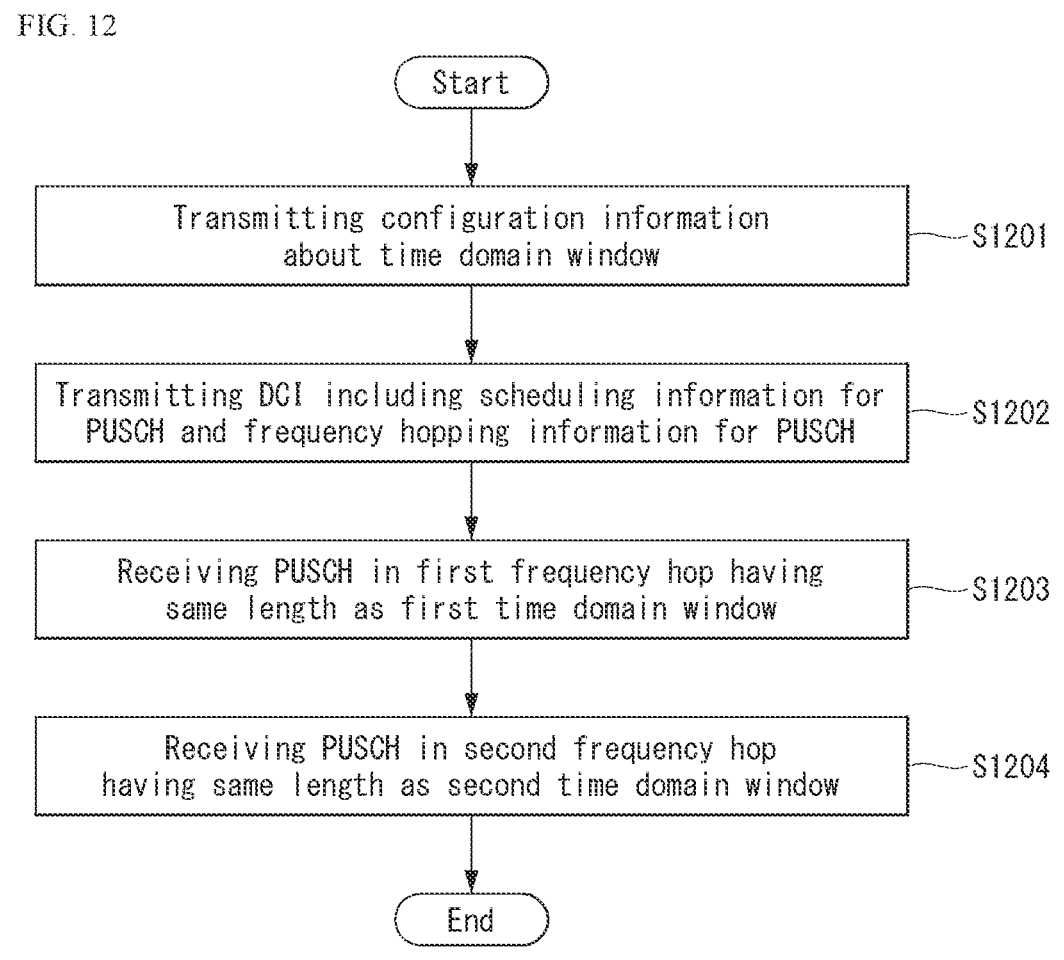

```
        ┌──────────────┐
        │    Start     │
        └──────┬───────┘
               │
               ▼
```

┌─────────────────────────────────────────────┐
│      Transmitting configuration information   │
│           about time domain window            │────S1201
└─────────────────────────────────────────────┘
               │
               ▼
┌─────────────────────────────────────────────┐
│  Transmitting DCI including scheduling information for │
│    PUSCH and frequency hopping information for PUSCH   │────S1202
└─────────────────────────────────────────────┘
               │
               ▼
┌─────────────────────────────────────────────┐
│    Receiving PUSCH in first frequency hop having   │
│      same length as first time domain window       │────S1203
└─────────────────────────────────────────────┘
               │
               ▼
┌─────────────────────────────────────────────┐
│       Receiving PUSCH in second frequency hop      │
│    having same length as second time domain window │────S1204
└─────────────────────────────────────────────┘
               │
               ▼
        ┌──────────────┐
        │     End      │
        └──────────────┘

FIG. 15

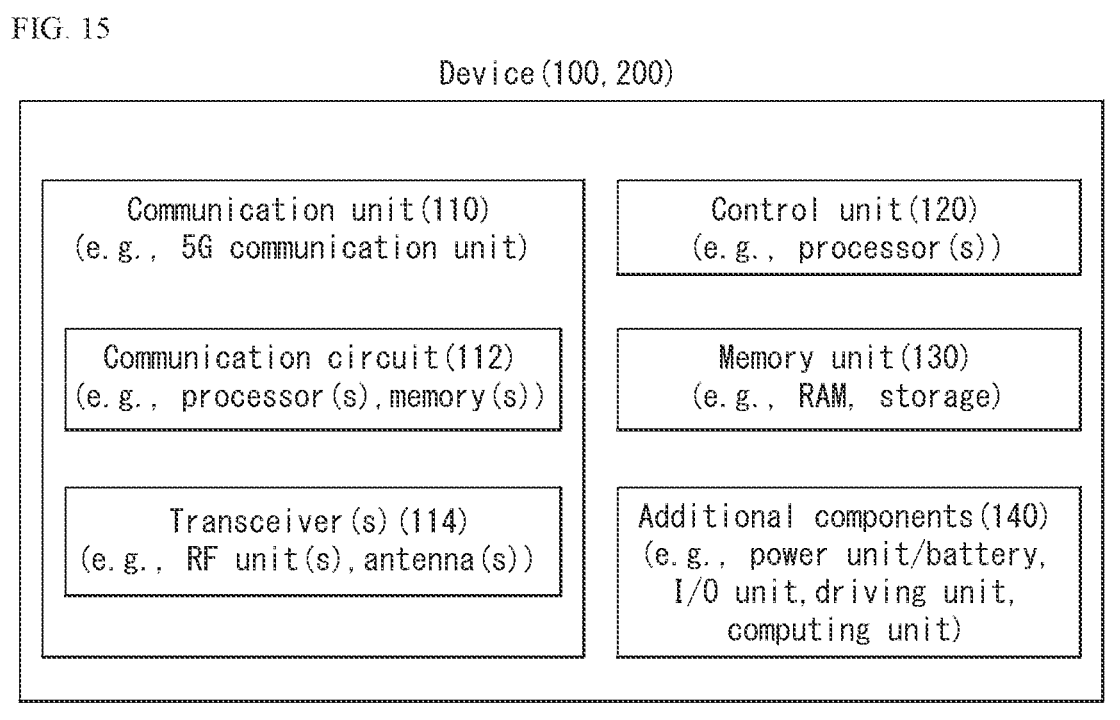

Device(100, 200)

Communication unit(110)
(e.g., 5G communication unit)

Communication circuit(112)
(e.g., processor(s),memory(s))

Transceiver(s)(114)
(e.g., RF unit(s),antenna(s))

Control unit(120)
(e.g., processor(s))

Memory unit(130)
(e.g., RAM, storage)

Additional components(140)
(e.g., power unit/battery,
I/O unit,driving unit,
computing unit)

METHOD FOR TRANSMITTING/RECEIVING PUSCH IN WIRELESS COMMUNICATION SYSTEM, AND DEVICE THEREFOR

CROSS-REFERENCE TO RELATED APPLICATIONS

This application is a National Stage application under 35 U.S.C. § 371 of International Application No. PCT/KR2022/004991, filed on Apr. 6, 2022, which claims the benefit of Korean Patent Application No. 10-2021-0044726, filed on Apr. 6, 2021 and Korean Patent Application No. 10-2022-0004238, filed on Jan. 11, 2022. The disclosures of the prior applications are incorporated by reference in their entirety.

Technical Field

The present disclosure relates to a wireless communication system, and more particularly to a method of transmitting and receiving a physical uplink shared channel (PUSCH) and a device therefor.

Background Art

Mobile communication systems have been developed to provide a voice service while ensuring the activity of a user. However, in the mobile communication system, not only a voice, but also a data service is extended. At present, there is a shortage of resources due to an explosive increase in traffic, and users demand a higher speed service. As a result, a more advanced mobile communication system is required.

Requirements for a next-generation mobile communication system should be able to support the acceptance of explosive data traffic, a dramatic increase in the per-user data rate, the acceptance of a significant increase in the number of connected devices, very low end-to-end latency, and high-energy efficiency. To this end, various technologies are researched, which include dual connectivity, massive multiple input multiple output (MIMO), in-band full duplex, non-orthogonal multiple access (NOMA), super wideband support, device networking, and the like.

Meanwhile, technologies for repeated transmissions of PUSCH/PUCCH are being discussed for the purpose of coverage enhancement.

DISCLOSURE

Technical Problem

The present disclosure proposes a method and device for defining/configuring a time domain window for demodulation reference signal (DMRS) bundling (or inter-slot bundling).

In addition, the present disclosure proposes a method and device for defining/configuring a time domain window based on the number of repeated transmissions of PUSCH/PUCCH.

In addition, the present disclosure proposes a method and device for defining/configuring a hopping interval having the same length as the time domain window.

Technical objects to be achieved by the present disclosure are not limited to the aforementioned technical objects, and other technical objects not described above may be evidently understood by a person having ordinary skill in the art to which the present disclosure pertains from the following description.

Technical Solution

The present disclosure proposes a method for transmitting a physical uplink shared channel (PUSCH) in a wireless communication system.

The method performed by a user equipment (UE) may comprise receiving configuration information related to a time domain window from a base station, receiving downlink control information (DCI) including scheduling information for the PUSCH and frequency hopping information for the PUSCH from the base station, transmitting the PUSCH to the base station in a first frequency hop having the same length as a first time domain window, and transmitting the PUSCH to the base station in a second frequency hop having the same length as a second time domain window.

In addition, in the above method of the present disclosure, lengths of the first frequency hop and the second frequency hop may be determined based on a length of the time domain window and a slot number within a radio frame.

In addition, in the above method of the present disclosure, a start resource block (RB) of the second frequency hop may be determined based on a start RB and frequency offset of the first frequency hop.

In addition, in the above method of the present disclosure, the first frequency hop may be an even-numbered hop, and the second frequency hop may be an odd-numbered hop.

In addition, in the above method of the present disclosure, a start resource block (RB) during slot $$n_s^\mu$$

for the PUSCH may be determined based on the following equation.

$$RB_{start}(n_s^\mu) = \begin{cases} RB_{start} & \lfloor n_s^\mu/W \rfloor \bmod 2 = 0 \\ (RB_{start} + RB_{offset}) \bmod N_{BWP}^{size} & \lfloor n_s^\mu/W \rfloor \bmod 2 = 1 \end{cases} \quad \text{[Equation]}$$

Where, $RB_{start}$ may represent a start RB of the first frequency hop, $RB_{offset}$ may represent a frequency offset between the first frequency hop and the second frequency hop, $$N_{BWP}^{size}$$

may represent a size of an uplink bandwidth part (BWP), and W may represent a length of the time domain window.

In addition, in the above method of the present disclosure, the time domain window may be a time domain window for demodulation reference signal (DMRS) bundling.

In addition, in the above method of the present disclosure, the time domain window, the same phase and transmission power may be maintained.

In addition, in the above method of the present disclosure, the time domain window may be configured based on a number of PUSCH repeated transmissions.

In addition, in the above method of the present disclosure, the PUSCH may be transmitted based on frequency hopping over a plurality of slots.

In addition, a user equipment (UE) configured to transmit a physical uplink shared channel (PUSCH) in a wireless communication system, the UE may comprise at least one transceiver, at least one processor, and at least one memory operably connected to the at least one processor, and storing instructions for performing operations based on being executed by the at least one processor, wherein the operations may include receiving configuration information related to a time domain window from a base station, receiving downlink control information (DCI) including scheduling information for the PUSCH and frequency hopping information for the PUSCH from the base station, transmitting the PUSCH to the base station in a first frequency hop having the same length as a first time domain window, and transmitting the PUSCH to the base station in a second frequency hop having the same length as a second time domain window.

In addition, the present disclosure proposes a method for receiving a physical uplink shared channel (PUSCH) in a wireless communication system. The method performed by a base station may comprise transmitting configuration information related to a time domain window to a user equipment (UE), transmitting downlink control information (DCI) including scheduling information for the PUSCH and frequency hopping information for the PUSCH to the UE, receiving the PUSCH from the UE in a first frequency hop having the same length as a first time domain window, and receiving the PUSCH from the UE in a second frequency hop having the same length as a second time domain window.

In addition, in the above method of the present disclosure, a start resource block (RB) of the second frequency hop may be determined based on a start RB and frequency offset of the first frequency hop.

In addition, in the above method of the present disclosure, the first frequency hop may be an even-numbered hop, and the second frequency hop may be an odd-numbered hop.

In addition, in the above method of the present disclosure, a start resource block (RB) during slot $$n_s^\mu$$

for the PUSCH may be determined based on the following equation.

[Equation]

$$RB_{start}(n_s^\mu) = \begin{cases} RB_{start} & \lfloor n_s^\mu / W \rfloor \bmod 2 = 0 \\ (RB_{start} + RB_{offset}) \bmod N_{BWP}^{size} & \lfloor n_s^\mu / W \rfloor \bmod 2 = 1 \end{cases}$$

Where, $RB_{start}$ may represent a start RB of the first frequency hop, $RB_{offset}$ may represent a frequency offset between the first frequency hop and the second frequency hop, $$N_{BWP}^{size}$$

may represent a size of an uplink bandwidth part (BWP), and W may represent a length of the time domain window.

In addition, in the above method of the present disclosure, the time domain window may be a time domain window for demodulation reference signal (DMRS) bundling.

In addition, in the above method of the present disclosure, the time domain window, the same phase and transmission power may be maintained.

In addition, in the above method of the present disclosure, the time domain window may be configured based on a number of PUSCH repeated transmissions.

In addition, a base station configured to receive a physical uplink shared channel (PUSCH) in a wireless communication system, the base station may comprise at least one transceiver, at least one processor, and at least one memory operably connected to the at least one processor, and storing instructions for performing operations based on being executed by the at least one processor, wherein the operations may include transmitting configuration information related to a time domain window to a user equipment (UE), transmitting downlink control information (DCI) including scheduling information for the PUSCH and frequency hopping information for the PUSCH to the UE, receiving the PUSCH from the UE in a first frequency hop having the same length as a first time domain window, and receiving the PUSCH from the UE in a second frequency hop having the same length as a second time domain window.

In addition, a processing apparatus configured to control a user equipment (UE) to transmit a physical uplink shared channel (PUSCH) in a wireless communication system in the present disclosure, the processing apparatus may comprise at least one processor, and at least one memory operably connected to the at least one processor, and storing instructions for performing operations based on being executed by the at least one processor, wherein the operations may include receiving configuration information related to a time domain window from a base station, receiving downlink control information (DCI) including scheduling information for the PUSCH and frequency hopping information for the PUSCH from the base station, transmitting the PUSCH to the base station in a first frequency hop having the same length as a first time domain window, and transmitting the PUSCH to the base station in a second frequency hop having the same length as a second time domain window.

In addition, a computer-readable storage medium storing at least one instruction, wherein the least one instruction causes at least one processor to control operations based on being executed by the at least one processor, wherein the operations may include receiving configuration information related to a time domain window from a base station, receiving downlink control information (DCI) including scheduling information for a physical uplink shared channel (PUSCH) and frequency hopping information for the PUSCH from the base station, transmitting the PUSCH to the base station in a first frequency hop having the same length as a first time domain window, and transmitting the PUSCH to the base station in a second frequency hop having the same length as a second time domain window.

Advantageous Effects

According to the present disclosure, there is an effect of improving coverage by defining/configuring a time domain window for DMRS bundling (or inter-slot bundling).

In addition, according to the present disclosure, there is an effect of efficiently performing joint channel estimation by defining/configuring a time domain window based on the number of repeated transmissions of PUSCH/PUCCH.

In addition, according to the present disclosure, by defining/configuring a hopping interval having the same length as the time domain window, there is an effect of performing inter-slot frequency hopping and joint channel estimation simultaneously.

Effects which may be obtained by the present disclosure are not limited to the aforementioned effects, and other technical effects not described above may be evidently understood by a person having ordinary skill in the art to which the present disclosure pertains from the following description.

DESCRIPTION OF DRAWINGS

The accompany drawings, which are included to provide a further understanding of the present disclosure and are incorporated on and constitute a part of this specification illustrate embodiments of the present disclosure and together with the description serve to explain the principles of the present disclosure.

FIG. 5 illustrates a slot structure of an NR frame to which the method proposed in the present disclosure may be applied.

FIG. 6 illustrates examples of a resource grid for each antenna port and numerology to which a method proposed in the present disclosure may be applied.

FIG. 10 illustrates an example of DMRS location according to mapping type and number of OFDM symbols.

FIG. 12 is a flowchart for explaining an operation method of a base station proposed in the present disclosure.

FIG. 15 illustrates another example of a wireless device applied to the present disclosure.

MODE FOR INVENTION

Figure 1:
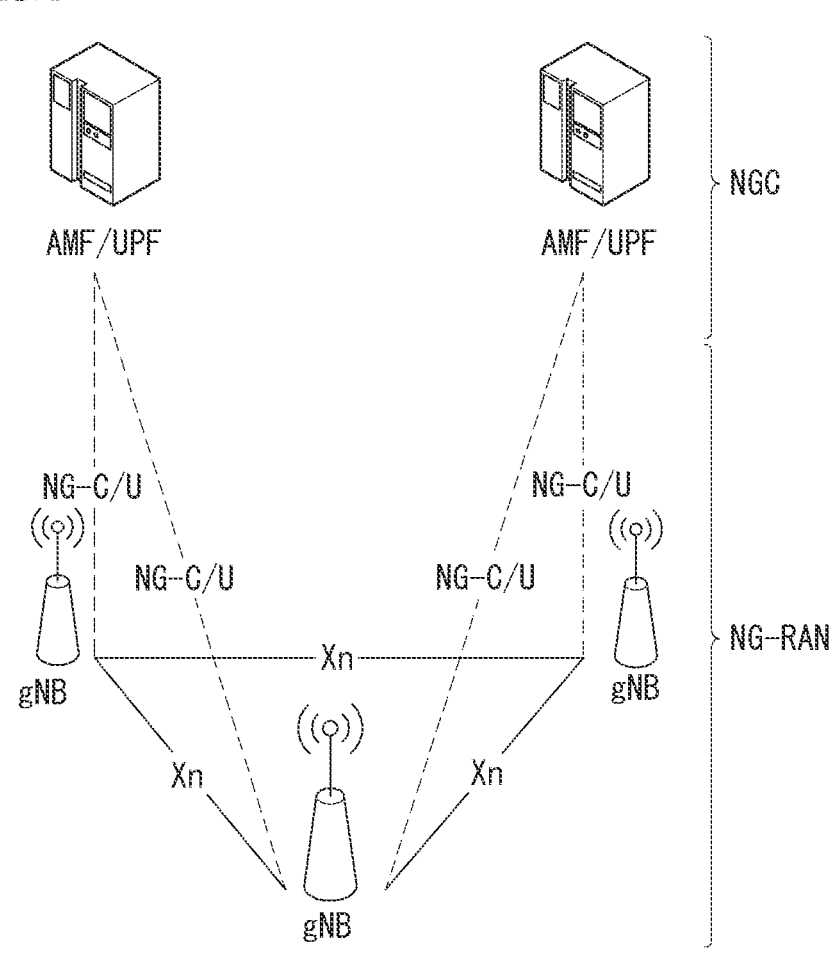
FIG. 1 is a diagram illustrating an example of an overall system structure of NR to which a method proposed in the present disclosure may be applied.

Reference will now be made in detail to embodiments of the present disclosure, examples of which are illustrated in the accompanying drawings. A detailed description to be disclosed below together with the accompanying drawing is to describe exemplary embodiments of the present disclosure and not to describe a unique embodiment for carrying out the present disclosure. The detailed description below includes details to provide a complete understanding of the present disclosure. However, those skilled in the art know that the present disclosure may be carried out without the details.

In some cases, in order to prevent a concept of the present disclosure from being ambiguous, known structures and devices may be omitted or illustrated in a block diagram format based on core functions of each structure and device.

Hereinafter, downlink (DL) means communication from the base station to the terminal and uplink (UL) means communication from the terminal to the base station. In downlink, a transmitter may be part of the base station, and a receiver may be part of the terminal. In uplink, the transmitter may be part of the terminal and the receiver may be part of the base station. The base station may be expressed as a first communication device and the terminal may be expressed as a second communication device. A base station (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various radio access system including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro.

For clarity of description, the technical spirit of the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a detailed standard document number. The LTE/NR may be collectively referred to as the 3GPP system. Matters disclosed in a standard document opened before the present disclosure may be referred to for a background art, terms, omissions, etc., used for describing the present disclosure. For example, the following documents may be referred to.

3GPP LTE 36.211: Physical channels and modulation 36.212: Multiplexing and channel coding 36.213: Physical layer procedures 36.300: Overall description 36.331: Radio Resource Control (RRC)

3GPP NR 38.211: Physical channels and modulation 38.212: Multiplexing and channel coding 38.213: Physical layer procedures for control 38.214: Physical layer procedures for data 38.300: NR and NG-RAN Overall Description 38.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. The introduction of next generation radio access technology considering enhanced mobile broadband communication (eMBB), massive MTC (mMTC), ultra-reliable and low latency communication (URLLC) is discussed, and in the present disclosure, the technology is called new RAT for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra-reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver may drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system may support remote treatment providing clinical treatment at a distant place. This helps to reduce a barrier for the distance and may improve access to medical services which are not continuously used at remote farming areas. Furthermore, this is used to save life in important treatment and an emergency condition. A radio sensor network based on mobile communication may provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a new RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. Different numerologies may be defined by scaling reference subcarrier spacing to an integer N.

DEFINITION OF TERMS eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview of System

FIG. 1 illustrates an example of an overall structure of a NR system to which a method proposed in the present disclosure is applicable.

Referring to FIG. 1, an NG-RAN consists of gNBs that provide an NG-RA user plane (new AS sublayer/PDCP/RLC/MAC/PHY) and control plane (RRC) protocol terminations for a user equipment (UE).

The gNBs are interconnected with each other by means of an Xn interface.

The gNBs are also connected to an NGC by means of an NG interface.

More specifically, the gNBs are connected to an access and mobility management function (AMF) by means of an N2 interface and to a user plane function (UPF) by means of an N3 interface.

New Rat (NR) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or $\mu$). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in a table 1.

TABLE 1

| $\mu$ | $\Delta f = 2^{\mu} \cdot 15 [kHz]$ | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

The NR supports multiple numerologies (or subcarrier spacing (SCS)) for supporting various 5G services. For example, when the SCS is 15 kHz, a wide area in traditional cellular bands is supported and when the SCS is 30 kHz/60 kHz, dense-urban, lower latency, and wider carrier bandwidth are supported, and when the SCS is more than 60 kHz, a bandwidth larger than 24.25 GHz is supported in order to overcome phase noise.

An NR frequency band is defined as frequency ranges of two types (FR1 and FR2). FR1 and FR2 may be configured as shown in Table 2 below. Further, FR2 may refer to a millimeter wave (mmW).

TABLE 2

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As described above, the numerical value of the frequency range of the NR system may be changed. For example, FR1 may include a band of 410 MHz to 7125 MHz as shown in Table 3 below. That is, FR1 may include a frequency band of 6 GHz (or 5850, 5900, 5925 MHz, etc.) or more. For example, the frequency band above 6 GHz (or 5850, 5900, 5925 MHz, etc.) included within FR1 may include an unlicensed band. Unlicensed bands may be used for a variety of purposes, for example, for communications for vehicles (e.g. autonomous driving).

TABLE 3

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, a size of various fields in the time domain is expressed as a multiple of a time unit of $T_s = 1/(\Delta f_{max} \cdot N_f)$. In this case, $\Delta f_{max} = 480 \cdot 10^3$, and $N_f = 4096$. DL and UL transmission is configured as a radio frame having a section of $T_f = (\Delta f_{max} N_f/100) \cdot T_s = 10$ ms. The radio frame is including ten subframes each having a section of $T_{sf} = (\Delta f_{max} N_f/1000)$. $T_s = 1$ ms. In this case, there may be a set of UL frames and a set of DL frames.

Figure 2:
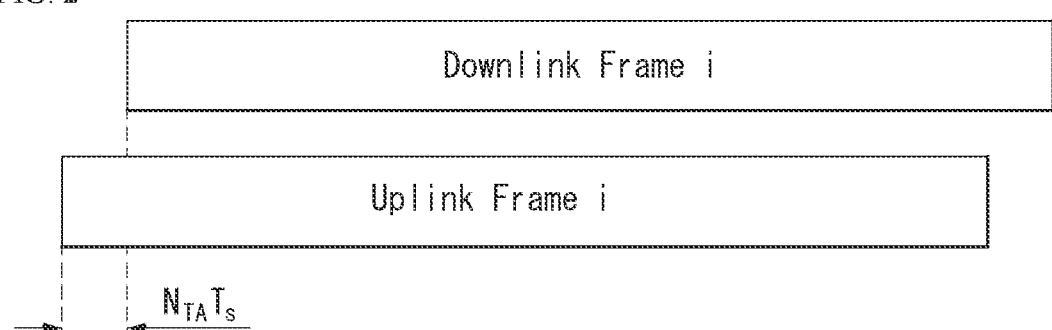
FIG. 2 illustrates a relationship between an uplink frame and a downlink frame in a wireless communication system to which a method proposed in the present disclosure may be applied.

FIG. 2 illustrates a relation between an uplink frame and a downlink frame in a wireless communication system to which a method proposed in the present disclosure is applicable.

As illustrated in FIG. 2, uplink frame number i for transmission from a user equipment (UE) shall start $T_{TA} = N_{TA} T_s$ before the start of a corresponding downlink frame at the corresponding UE.

Regarding the numerology μ, slots are numbered in increasing order of $$n_s^\mu \in \{0, \ldots, N_{subframe}^{slots,\mu} - 1\}$$

within a subframe and are numbered in increasing order of $$n_{s,f}^\mu \in \{0, \ldots, N_{frame}^{slots,\mu} - 1\}$$

within a radio frame. One slot consists of consecutive OFDM is determined depending on a numerology used and slot symbols of $$N_{symb}^\mu,$$

and $$N_{symb}^\mu$$

is determined depending on a numerology used and slot configuration. The start of slots $$n_s^\mu$$

in a subframe is aligned in time with the start of OFDM symbols $$n_s^\mu N_{symb}^\mu$$

in the same subframe.

Not all UEs are able to transmit and receive at the same time, and this means that not all OFDM symbols in a downlink slot or an uplink slot are available to be used.

Table 4 represents the number $$N_{symb}^{slots}$$

of OFDM symbols per slot, the number $$N_{slot}^{frame,\mu}$$

of slots per radio frame, and the number $$N_{slot}^{subframe,\mu}$$

of slots per subframe in a normal CP. Table 5 represents the number of OFDM symbols per slot, the number of slots per radio frame, and the number of slots per subframe in an extended CP.

TABLE 4

| μ | $N_{symb}^{slot}$ | $N_{slot}^{frame,\,\mu}$ | $N_{slot}^{subframe,\,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 5

| μ | $N_{symb}^{slot}$ | $N_{slot}^{frame, μ}$ | $N_{slot}^{subframe, μ}$ |
|---|---|---|---|
| 2 | 12 | 40 | 4 |

Figure 3:
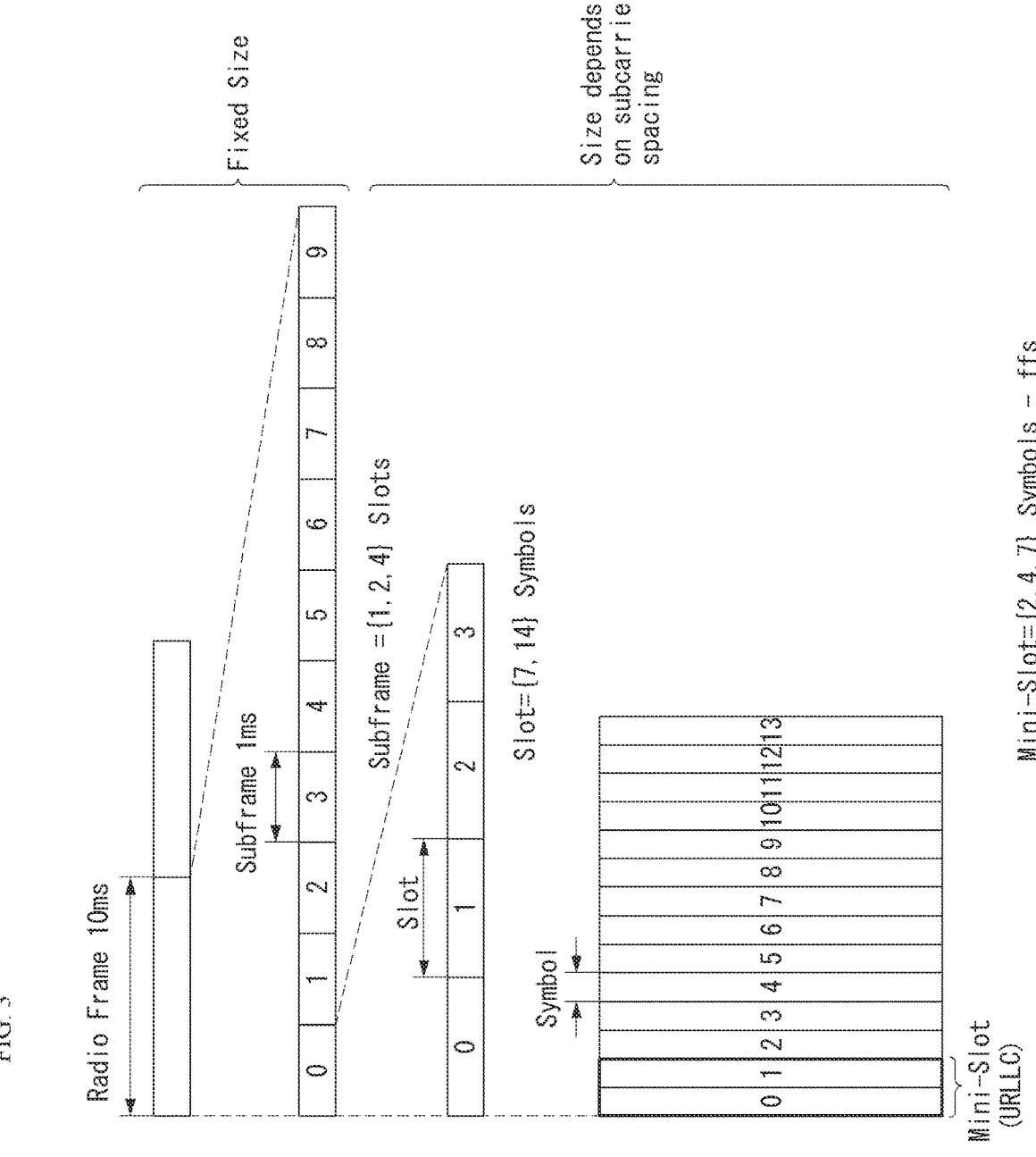
FIG. 3 illustrates an example of a frame structure in an NR system.

FIG. 3 illustrates an example of a frame structure in a NR system. FIG. 3 is merely for convenience of explanation and does not limit the scope of the present disclosure.

In Table 5, in case of μ=2, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may include 2, 4, or 7 symbols, or may include more symbols or less symbols.

In regard to physical resources in the NR system, an antenna port, a resource grid, a resource element, a resource block, a carrier part, etc. May be considered.

Hereinafter, the above physical resources that may be considered in the NR system are described in more detail.

First, in regard to an antenna port, the antenna port is defined so that a channel over which a symbol on an antenna port is conveyed may be inferred from a channel over which another symbol on the same antenna port is conveyed. When large-scale properties of a channel over which a symbol on one antenna port is conveyed may be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

Figure 4:
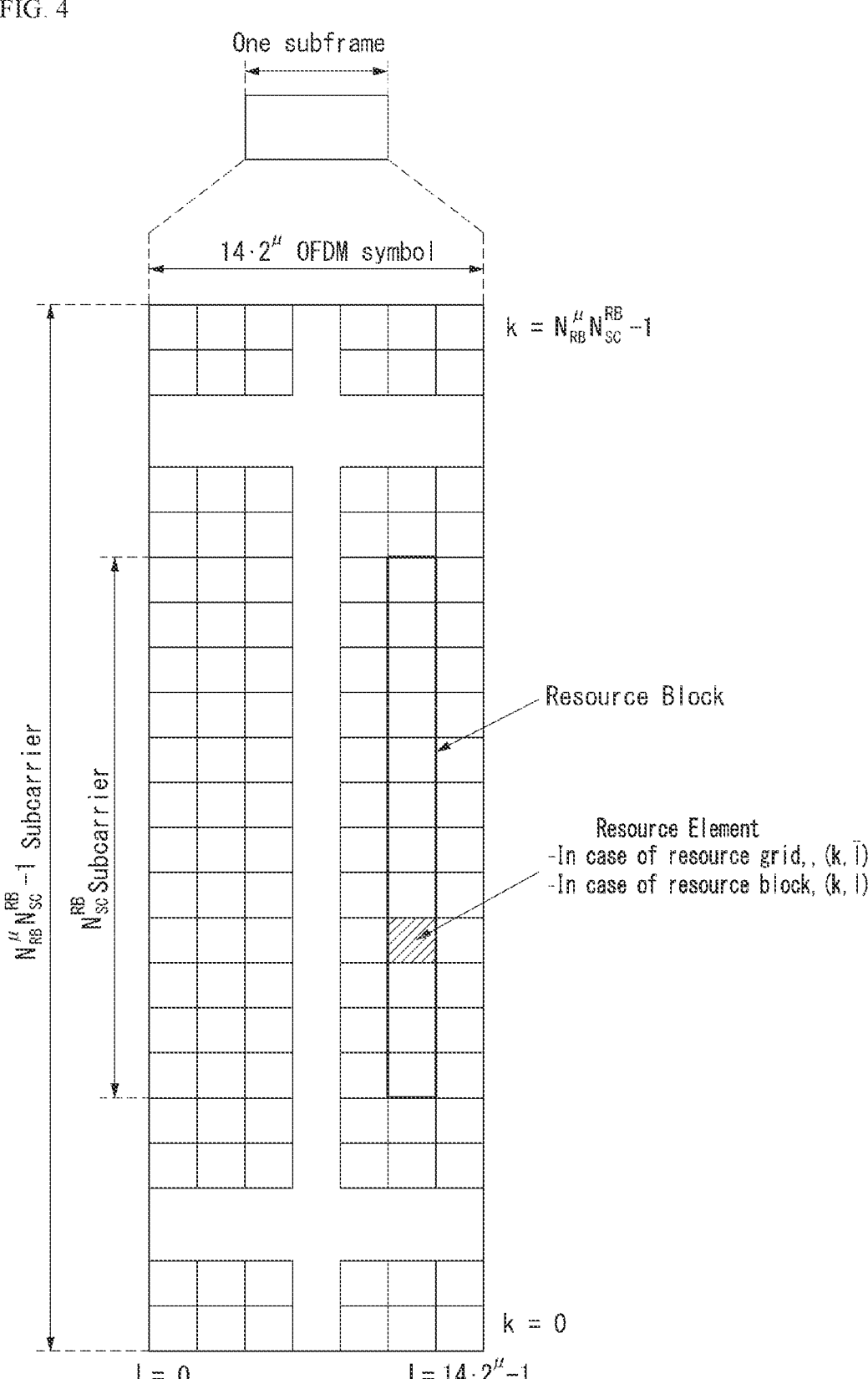
FIG. 4 illustrates an example of a resource grid supported by a wireless communication system to which a method proposed in the present disclosure may be applied.

FIG. 4 illustrates an example of a resource grid supported in a wireless communication system to which a method proposed in the present disclosure is applicable.

Referring to FIG. 4, a resource grid consists of $$N_{RB}^{μ}N_{sc}^{RB}$$

subcarriers on a frequency domain, each subframe including 14·2μ OFDM symbols, but the present disclosure is not limited thereto.

In the NR system, a transmitted signal is described by one or more resource grids, including $$N_{RB}^{μ}N_{sc}^{RB}$$

subcarriers, and $$2^{μ}N_{symb}^{(μ)}$$

OFDM symbols, where $$N_{RB}^{μ} ≤ N_{RB}^{max,μ}.$$

$$N_{RB}^{max,μ}$$

denotes a maximum transmission bandwidth and may change not only between numerologies but also between uplink and downlink.

Figure 6:
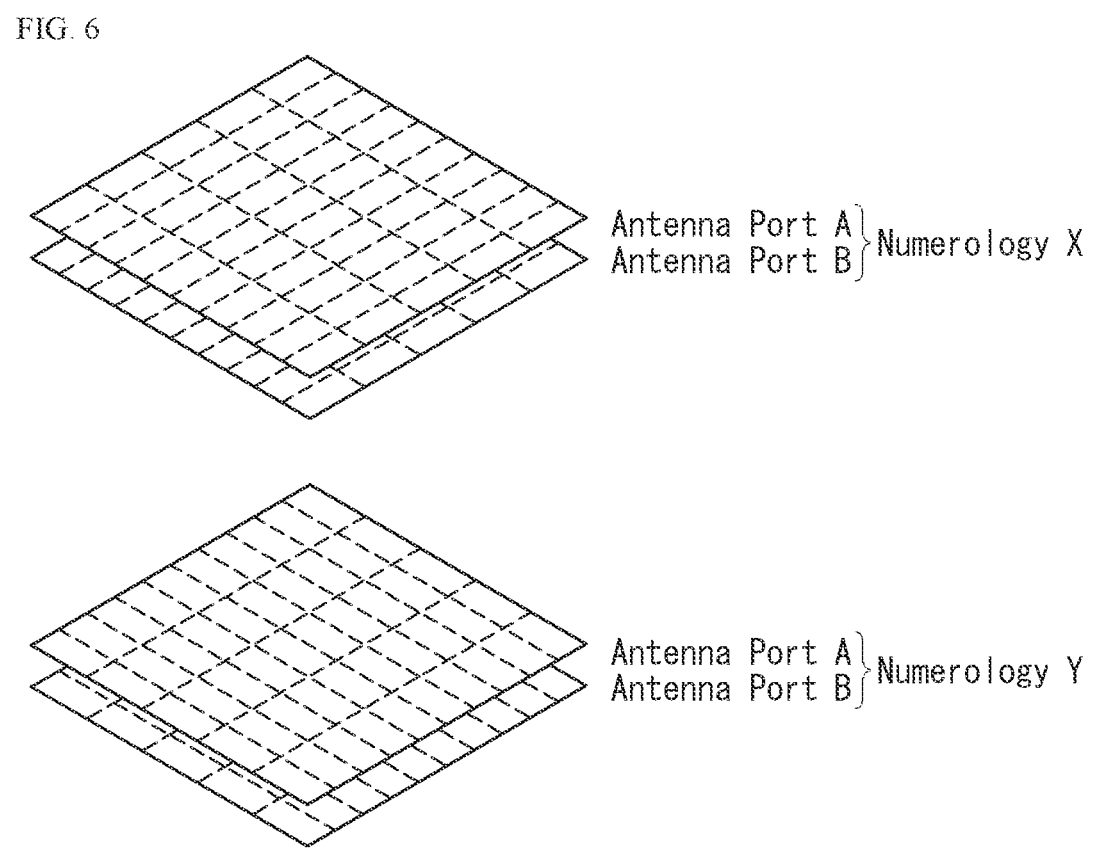

In this case, as illustrated in FIG. 6, one resource grid may be configured per numerology μ and antenna port p.

Figure 5:
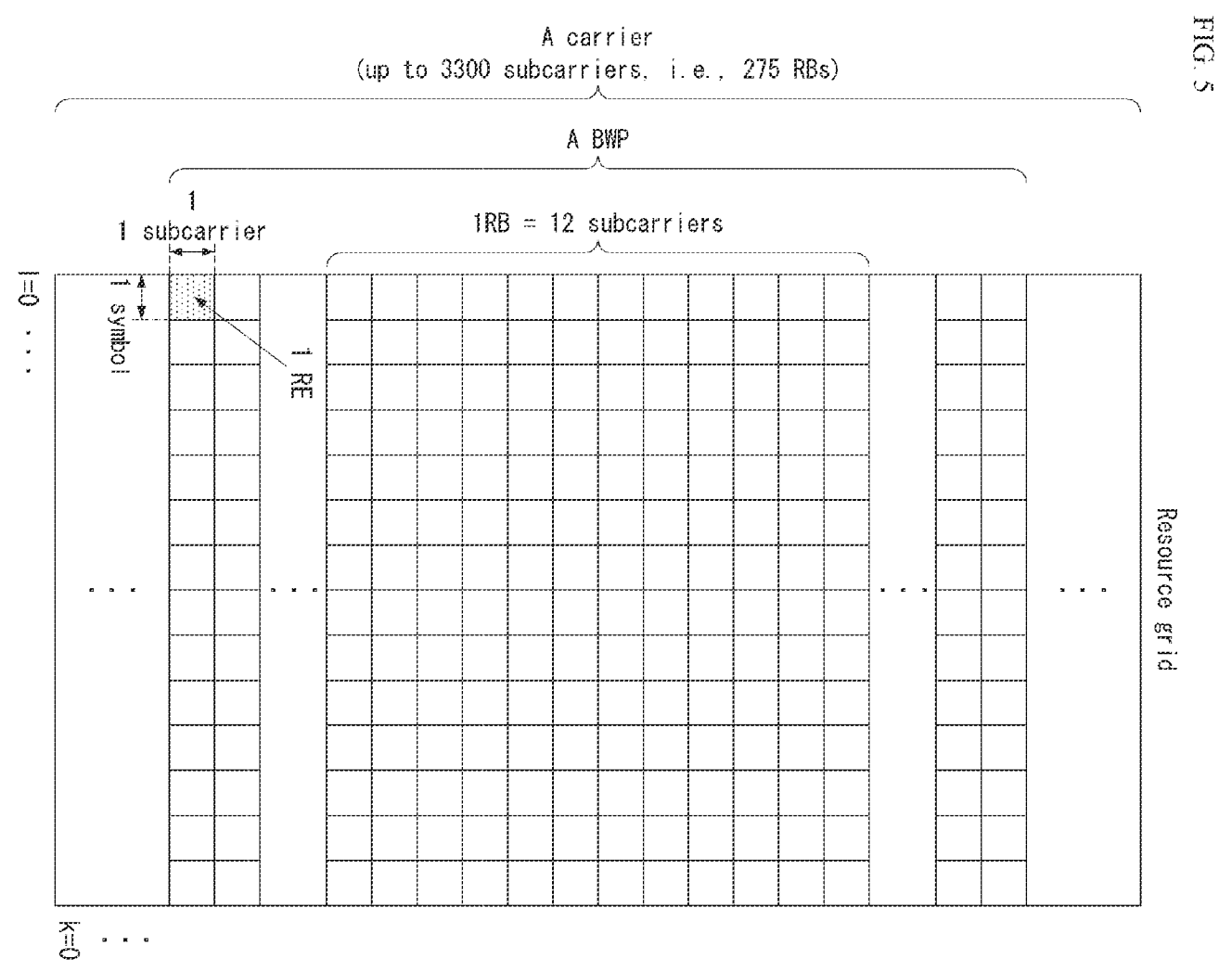

FIG. 5 illustrates a slot structure of an NR frame to which the method proposed in the present disclosure may be applied.

A slot includes a plurality of symbols in a time domain. For example, in the case of a normal CP, one slot includes 7 symbols, but in the case of an extended CP, one slot includes 6 symbols. A carrier includes a plurality of subcarriers in a frequency domain. A resource block (RB) is defined as a plurality of (e.g., 12) consecutive subcarriers in the frequency domain. A bandwidth part (BWP) is defined as a plurality of consecutive (P) RBs in the frequency domain, and may correspond to one numerology (e.g., SCS, CP length, etc.). A carrier may include a maximum of N (e.g., 5) BWPs. Data communication is performed through the activated BWP, and only one BWP may be activated for one terminal. Each element in the resource grid is referred to as a resource element (RE), and one complex symbol may be mapped.

FIG. 6 illustrates examples of a resource grid per antenna port and numerology to which a method proposed in the present disclosure is applicable.

Each element of the resource grid for the numerology μ and the antenna port p is called a resource element and is uniquely identified by an index pair (k,l̄), where $$k = 0, \ldots, N_{RB}^{μ}N_{sc}^{RB} - 1$$

is an index on a frequency domain, and $$l̄ = 0, \ldots, 2^{μ}N_{symb}^{(μ)} - 1$$

refers to a location of a symbol in a subframe. The index pair (k,l) is used to refer to a resource element in a slot, where $$l = 0, \ldots, N_{symb}^{μ} - 1.$$

The resource element (k,l̄) for the numerology μ and the antenna port p corresponds to a complex value $$a_{k,l̄}^{(p,μ)}.$$

When there is no risk for confusion or when a specific antenna port or numerology is not specified, the indices p and μ may be dropped, and as a result, the complex value may be $$a_{k,l̄}^{(p)} \text{ or } a_{k,l̄}.$$

Further, a physical resource block is defined as $$N_{sc}^{RB} = 12$$

consecutive subcarriers in the frequency domain.

Point A serves as a common reference point of a resource block grid and may be obtained as follows.

offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;

absoluteFrequencyPointA represents frequency-location of the point A expressed as in absolute radio-frequency channel number (ARFCN);

The common resource blocks are numbered from 0 and upwards in the frequency domain for subcarrier spacing configuration μ.

The center of subcarrier 0 of common resource block 0 for the subcarrier spacing configuration μ coincides with "point A". A common resource block number $$n_{CRB}^{\mu}$$

in the frequency domain and resource elements (k, l) for the subcarrier spacing configuration μ may be given by the following Equation 1.

$$n_{CRB}^{\mu} = \left\lfloor \frac{k}{N_{sc}^{RB}} \right\rfloor \qquad \text{[Equation 1]}$$

Here, k may be defined relative to the point A so that k=0 corresponds to a subcarrier centered around the point A. Physical resource blocks are defined within a bandwidth part (BWP) and are numbered from 0 to $$N_{BWP,i}^{size} - 1,$$

where i is No. Of the BWP. A relation between the physical resource block $n_{PRB}$ in BWP i and the common resource block $n_{CRB}$ may be given by the following Equation 2.

$$n_{CRB} = n_{PRB} + N_{BWP,i}^{start} \qquad \text{[Equation 2]}$$

Here, $$N_{BWP,i}^{start}$$

may be the common resource block where the BWP starts relative to the common resource block 0.

Physical Channel and General Signal Transmission

Figure 7:
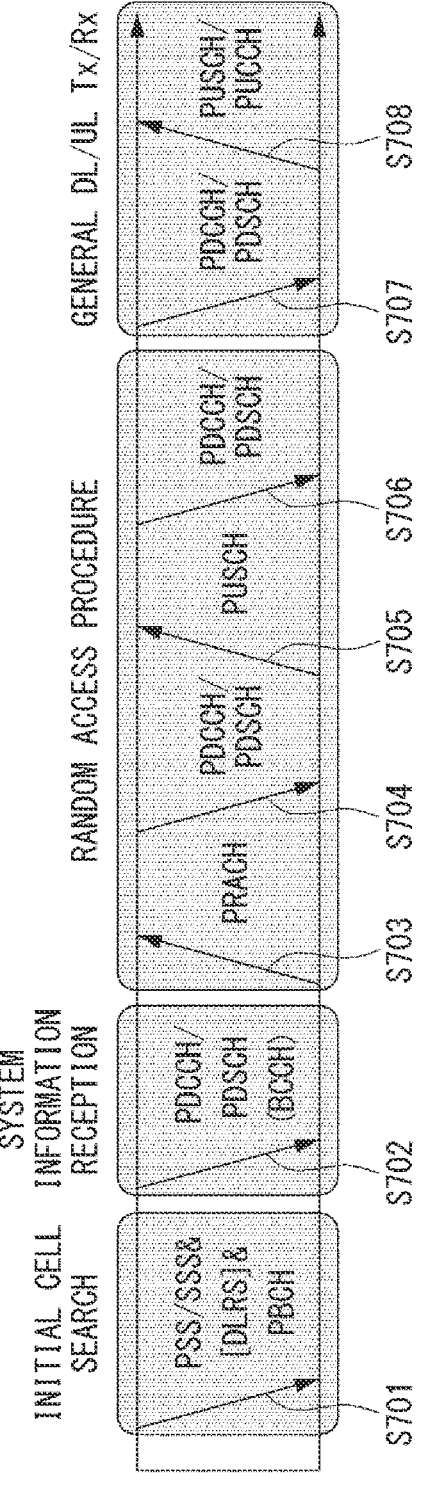
FIG. 7 illustrates physical channels and general signal transmission.

FIG. 7 illustrates physical channels and general signal transmission. In a wireless communication system, the UE receives information from the eNB through Downlink (DL)

and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S701). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S702).

Meanwhile, when there is no radio resource first accessing the eNB or for signal transmission, the UE may perform a Random Access Procedure (RACH) to the eNB (S703 to S706). To this end, the UE may transmit a specific sequence to a preamble through a Physical Random Access Channel (PRACH) (S703 and S705) and receive a response message (Random Access Response (RAR) message) for the preamble through the PDCCH and a corresponding PDSCH. In the case of a contention based RACH, a Contention Resolution Procedure may be additionally performed (S706).

The UE that performs the above procedure may then perform PDCCH/PDSCH reception (S707) and Physical Uplink Shared Channel (PUSCH)/Physical Uplink Control Channel (PUCCH) transmission (S708) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., via the PUSCH and/or PUCCH.

PUCCH Format of NR

NR supports a total of 5 PUCCH formats, which can be divided into short PUCCH and long PUCCH depending on duration. Table 6 shows 5 PUCCH formats.

Shot Duration PUCCH

Format 0: for UCI up to 2 bits, with multiplexing

Format 2: for UCI of more than 2 bits, no multiplexing

Long Duration PUCCH

Format 1: for UCI of up to 2 bits, with multiplexing

Format 3: for UCI of more than 2 bits, no multiplexing

Format 4: for UCI of more than 2 bits, with multiplexing

TABLE 6

| Format | PUCCH duration in OFDM symbols | Number of bits | Usage | Etc. |
|---|---|---|---|---|
| 0 | 1-2 | ≤2 | HARQ, SR | Sequence selection |
| 1 | 4-14 | ≤2 | HARQ, SR | Sequence modulation (by BPSK or QPSK) |
| 2 | 1-2 | >2 | HARQ, CSI, SR | CP-OFDM |
| 3 | 4-14 | >2 | HARQ, CSI, SR | DFT-s-OFDM |
| 4 | 4-14 | >2 | HARQ, CSI, SR | DFT-s-OFDM (with pre-DFT OCC) |

PUCCH Coverage Enhancement (CE)

Regarding PUCCH enhancements, the following methods may be considered to improve PUCCH coverage.

DMRS-less PUCCH: Design details for DMRS-less PUCCH may be further studied (e.g. sequence based PUCCH transmission, vs. reusing Rel-15 scheme to transmit UCI without DMRS)

Rel-16 PUSCH-repetition-Type-B like PUCCH repetition for minimum UCI<=11 bits (explicit or implicit) dynamic PUCCH repetition factor indication DMRS bundling over PUCCH repetitions: Includes research on transmitting a subset of PUCCH repetitions without DMRS, at least for UCI<=11 bits DMRS bundling for PUCCH repetition may be considered together with DMRS bundling for PUSCH repetition.

The PUCCH repetitions scheme must describe the resources used by PUSCH to meet the throughput target and may be compared to Rel-15/16 PUCCH repetition.

Table 7 shows the PUCCH coverage enhancement techniques under consideration.

TABLE 7

PUCCH coverage enhancement techniques under consideration

Sequence based DMRS-less PUCCH
PUSCH repetition Type-B like PUCCH repetition
(Explicit or implicit) Dynamic PUCCH repetition factor indication
Sequence based PF 0/1 with Pi/2 BPSK
Pre-DFT data-RS multiplexing for PF2 with Pi/2 BPSK
DMRS bundling for PUCCH
Compact UCI
Freq hopping enhancement for PUCCH
Short/mini-slot PUCCH repetition
Power control enhancement for PUCCH
Increase maximum # allowed repetitions for PUCCH
PUCCH Transmit diversity scheme
DMRS overhead reduction
UE Antenna configuration enhancement for FR2
Higher DMRS density
A-CSI on PUCCH
Symbol-level PUCCH repetition
Relay (including sidelink relay)
Reflective arrays
Split UCI payload on short and long PUCCH on adjacent S and U slots PUSCH Repetition PUSCH repetition type A and type B were introduced in NR Rel-15/16, and transmission is performed as follows depending on the PUSCH repetition type.

PUSCH Repetition Type A

Figures 8, 9:
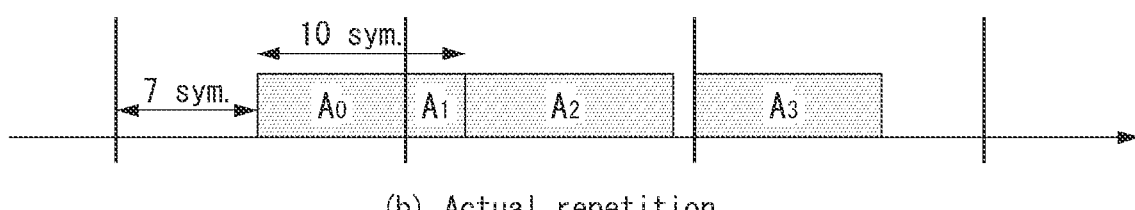
FIG. 8 illustrates an example of PUSCH repetition type A.
FIG. 9 illustrates an example of PUSCH repetition type B.

FIG. 8 illustrates an example of PUSCH repetition type A. PUSCH repetition type A performs repetition with the same PUSCH transmission start symbol location and PUSCH transmission symbol length for each slot, as shown in FIG. 8, with slot based repetition. At this time, if there is an invalid symbol that cannot be used for PUSCH transmission among the symbol resources constituting a specific PUSCH repetition, the transmission of the corresponding PUSCH repetition is dropped and is not performed. That is, when a total of 4 PUSCH repetition transmissions of Rep0, Rep1, Rep2, and Rep3 are performed, if an invalid symbol is included in the symbol resources constituting Rep1, the transmission of Rep1 is dropped, and only the transmission of Rep0, Rep2, and Rep3 is performed. Therefore, the number of repetitions actually performed may be smaller than the number of configured repetitions.

In the case of PUSCH repetition Type A, the UE is configured for frequency hopping by upper layer parameters.

One of the following two frequency hopping modes may be configured.

intra-slot frequency hopping, which can be applied to single slot PUSCH transmission and multi-slot PUSCH transmission inter-slot frequency hopping that can be applied to multi-slot PUSCH transmission PUSCH Repetition Type B FIG. 9 illustrates an example of PUSCH repetition type B. In PUSCH repetition type B, repetition is performed in units of the symbol length through which the actual PUSCH is transmitted.

That is, when the PUSCH is transmitted in 10 symbols as shown in FIG. 9 (a), PUSCH repetition is performed in units of 10 consecutive symbols. Repetition that determines PUSCH repetition transmission time resources without considering slot boundary, invalid symbol, etc. is called nominal repetition.

However, in the case of actual PUSCH repetition, one PUSCH cannot be transmitted at the slot boundary. When PUSCH transmission includes the slot boundary, two actual repetitions are performed around the slot boundary, as shown in FIG. 9 (b). Additionally, one PUSCH transmission may only be performed through consecutive symbols. If an invalid symbol exists in the time resource where PUSCH repetition should be transmitted, actual repetition is constructed using consecutive symbols with the invalid symbol as a boundary. For example, if symbols #0~#9 constitute one nominal repetition and symbols #3~#5 are invalid symbols, symbols #0~#2 and symbols #6~#9,excluding the invalid symbol, each constitute one actual repetition.

If a symbol that cannot be used for PUSCH transmission (e.g. DL symbol indicated by DCI format 2_0) is included in one actual repetition resource, the actual repetition transmission is dropped and is not performed.

For PUSCH repetition type B, the UE is configured for frequency hopping by upper layer parameters.

Frequency hopping mode for Type 2 configured PUSCH transmission follows the configuration of activating DCI format. One of two frequency hopping modes may be configured.

inter-repetition frequency hopping inter-slot frequency hopping

DMRS for PDSCH/PUSCH

DMRS for PDSCH/PUSCH consists of front load DMRS and additional DMRS.

Front load DMRS

The transmission time resource location of the front load DMRS is determined by the following factors.

The mapping type (PDSCH mapping type/PUSCH mapping type) of the data channel may vary depending on whether it is Type A or Type B (slot based or non-slot based), and the mapping type is configured through RRC.

In the case of slot based transmission, the transmission start OFDM symbol location of the front load DMRS may be the 3rd or 4th OFDM symbol of the data transmission resource, and an indication as to whether the transmission start OFDM symbol location is the 3rd OFDM symbol or the 4th OFDM symbol is transmitted through the PBCH.

Front load DMRS may be composed of one or two consecutive OFDM symbols, and whether the number of OFDM symbols is one or two is configured through RRC.

The mapping type within the transmission OFDM symbol resource of front load DMRS may have two types (Type 1 or Type 2), and information related to the applicable type is configured as RRC. For Type 1, F-CDM (CDM in frequency domain), T-CDM (CDM in time domain), and/or FDM techniques are used to support 4 or 8 antenna ports, respectively, depending on whether the DMRS symbol length is 1 or 2. For Type 2, F-CDM, T-CDM, and/or FDM techniques are used to support 6 or 12 antenna ports, respectively, depending on whether the DMRS symbol length is 1 or 2.

Additional DMRS

The number of Additional DMRS is determined as 0, 1, 2, or 3. The maximum number of additional DMRSs transmitted is determined through RRC, and within each maximum number of DMRSs, the number of additional DMRSs actually transmitted and the transmitted OFDM symbol location are determined according to the length of the OFDM symbol through which data is transmitted. The symbol locations of the front load DMRS and additional DMRS according to the data symbol length are as shown in FIG. 10.

The number of OFDM symbols and mapping type of each additional DMRS are determined to be the same as the number of OFDM symbols and mapping type of the front load DMRS.

Figure 10:
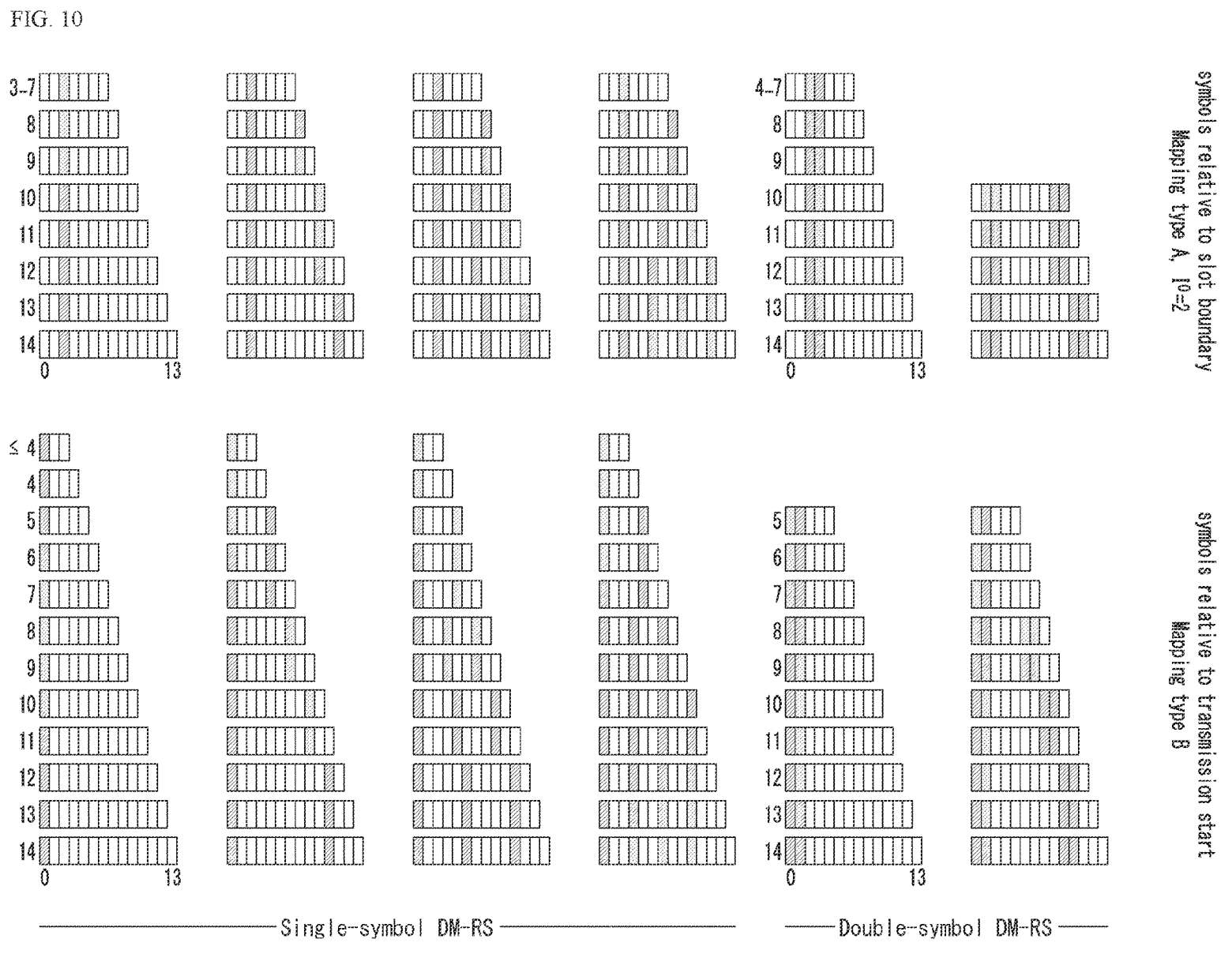

FIG. 10 illustrates an example of DMRS location according to mapping type and number of OFDM symbols.

The location and number of symbols of the current PUSCH DMRS vary depending on the length of the symbol through which the PUSCH is transmitted. In particular, when using PUSCH repetition type B, the location and number of DMRS symbols are determined based on the actual repetition length of the PUSCH. In this case, the location of the DMRS may vary for each PUSCH repetition.

According to the Liaison Statement (LS) of RAN4, in order to perform joint channel estimation, it must be transmitted in the same physical resource block (PRB). That is, when joint channel estimation is configured, inter-slot frequency hopping should not occur according to existing rules. Therefore, enhancement of frequency hopping between slots is necessary.

The following is a description of frequency hopping of PUSCH in subclauses 6.3.1 and 6.3.2 of 3GPP technical specification (TS) 38.214.

Frequency Hopping for PUSCH Repetition Type A

In the case of PUSCH repetition Type A, the UE may be configured for frequency hopping by the higher layer parameter frequencyHopping-ForDCIFormat0_2 of pusch-Config for PUSCH transmission scheduled by DCI format 0_2, by frequencyhopping provided in pusch-Config for PUSCH transmission scheduled by a DCI format other than 0_2, and by frequencyHopping provided in configureGrantConfig for configured PUSCH transmission. One of two frequency hopping modes may be configured.

Intra-slot frequency hopping, applicable to single slot and multi-slot PUSCH transmission Inter-slot frequency hopping, applicable to multi-slot PUSCH transmission In the case of resource allocation type 2, the UE may transmit PUSCH without frequency hopping.

In the case of resource allocation type 1, depending on whether conversion precoding for PUSCH transmission is enabled, if the frequency hopping field is configured to 1 in the corresponding detected DCI format or random access response UL grant, or if the upper layer parameter frequencyHoppingOffset is provided for Type 1 PUSCH transmission with a configured grant, the UE may perform PUSCH frequency hopping.

Otherwise, PUSCH frequency hopping may not be performed. If frequency hopping is enabled for PUSCH, RE mapping may be defined in a predefined specification (e.g. 3GPP TS 38.211, clause 6.3.1.6).

In the case of a PUSCH scheduled by RAR UL grant, fallbackRAR UL grant, or DCI format 0_0 with cyclic redundancy check (CRC) scrambled by temporary cell (TC)-radio network temporary identifier (RNTI), the frequency offset may be obtained as described in the predefined specification (3GPP TS 38.213, clause 8.3).

In the case of a PUSCH scheduled by DCI format 0_0/0_1 or a PUSCH based on a Type2 configured UL grant enabled by DCI format 0_0/0_1, and in the case of resource allocation type 1, the frequency offset may be configured by frequencyHoppingOffsetLists, which is an upper layer parameter of pusch-Config. In the case of a PUSCH scheduled by DCI format 0_2 or a PUSCH based on a Type2 configured UL grant enabled by DCI format 0_2, and in the case of resource allocation type 1, the frequency offset may be configured by frequencyHoppingOffsetLists-ForDCIFormat0_2, which is an upper layer parameter of pusch-Config.

If the size of the active BWP is less than 50 PRB, one of two higher layer configured offsets may be indicated in the UL grant.

If the size of the active BWP is 50 PRB or more, one of four higher layer configured offsets may be indicated in the UL grant.

In the case of PUSCH based on Type1 configured UL grant, the frequency offset may be provided by the upper layer parameter frequencyHoppingOffset of rrc-ConfiguredUplinkGrant.

In the case of intra-slot frequency hopping, the start RB of each hopping may be given as Equation 3.

$$RB_{start} = \begin{cases} RB_{start} & i = 0 \\ (RB_{start} + RB_{offset}) \bmod N_{BWP}^{size} & i = 1 \end{cases} \quad \text{[Equation 3]}$$

Here, i=0 and i=1 are the first hop and second hop, respectively, and $RB_{start}$ is the start RB in the UL BWP and may be calculated from the resource block assignment information of resource allocation type 1. $RB_{offset}$ is the frequency offset in RB units between two frequency hops. The number of symbols in the first hop may be given by $$\lfloor N_{symb}^{PUSCH,s}/2 \rfloor.$$

The number of symbols in the second hop may be given by $$N_{symb}^{PUSCH,s} - \lfloor N_{symb}^{PUSCH,s}/2 \rfloor.$$

Here, $$N_{symb}^{PUSCH,s}$$

may be the length of PUSCH transmission in the OFDM symbol of one slot.

In the case of inter-slot frequency hopping, the start RB among slots $$n_s^{\mu}$$

may be given as Equation 4.

[Equation 4]

$$RB_{start}(n_s^{\mu}) = \begin{cases} RB_{start} & n_s^{\mu} \bmod 2 = 0 \\ (RB_{start} + RB_{offset}) \bmod N_{BWP}^{size} & n_s^{\mu} \bmod 2 = 1 \end{cases}$$

Here, $$n_s^{\mu}$$

may be the current slot number in the radio frame where multi-slot PUSCH transmission may occur, and $RB_{start}$ may be the start RB in the UL BWP calculated from the resource block allocation information of resource allocation type 1. $RB_{offset}$ may be a frequency offset in RB units between two frequency hops.

Frequency Hopping for PUSCH Repetition Type B

In the case of PUSCH repetition Type B, the UE may be configured for frequency hopping by the upper layer parameter frequencyHopping-ForDCIFormat0_2 of pusch-Config for PUSCH transmission scheduled by DCI format 0_2, by frequencyHopping-ForDCIFormat0_1 provided in pusch-Config for PUSCH transmission scheduled by DCI format 0_1, and by frequencyHopping-PUSCHRepTypeB provided rrc-ConfiguredUplinkGrant for Type 1 configured PUSCH transmission. The frequency hopping mode for Type 2 configured PUSCH transmission may follow the configuration of the activating DCI format. One of two frequency hopping modes may be configured.

Inter-repetition frequency hopping

Inter-slot frequency hopping

In the case of Resource allocation type 1, depending on whether conversion precoding for PUSCH transmission is enabled, if the frequency hopping field is configured to 1 in the corresponding detected DCI format or the upper layer parameter frequencyHopping-PUSCHRepTypeB for Type 1 PUSCH transmission with a configured grant is provided, the UE may perform PUSCH frequency hopping. Otherwise, PUSCH frequency hopping may not be performed. If frequency hopping is enabled for PUSCH, RE mapping may be defined in a predefined specification (e.g. 3GPP TS 38.211, clause 6.3.1.6).

In the case of a PUSCH scheduled by DCI format 0_1 or a PUSCH based on a Type 2 configured UL grant enabled by DCI format 0_1, and in the case of resource allocation type 1, the frequency offset may be configured by frequencyHoppingOffsetLists, which is an upper layer parameter of pusch-Config. In the case of a PUSCH scheduled by DCI format 0_2 or a PUSCH based on a Type2 configured UL grant enabled by DCI format 0_2, and in the case of resource allocation type 1, the frequency offset may be configured by frequencyHoppingOffsetLists-ForDCIFormat0_2, which is an upper layer parameter of pusch-Config.

If the size of the active BWP is less than 50 PRB, one of the two higher layer configured offsets may be indicated in the UL grant.

If the size of the active BWP is 50 PRB or more, one of four higher layer configured offsets may be indicated in the UL grant.

In the case of PUSCH based on Type1 configured UL grant, the frequency offset may be provided by the upper layer parameter frequencyHoppingOffset of rrc-ConfiguredUplinkGrant.

In the case of inter-repetition frequency hopping, the start RB within the n-th nominal repetition may be given as in Equation 5.

[Equation 5]

$$RB_{start}(n) = \begin{cases} RB_{start} & n \bmod 2 = 0 \\ (RB_{start} + RB_{offset}) \bmod N_{BWP}^{size} & n \bmod 2 = 1 \end{cases}$$

Here, $RB_{start}$ may be the start RB in the UL BWP calculated from the resource block assignment information of resource allocation type 1, and $RB_{offset}$ may be the frequency offset in RB units between two frequency hops.

In the case of inter-slot frequency hopping, the start RB among slots may follow the start RB of inter-slot frequency hopping for PUSCH repetition type A of the predefined specification (3GPP TS 38.214, clause 6.3.1).

As described above, the existing inter-slot frequency hopping determines to transmit the corresponding transmission occasion to which of the two PRBs according to the index within the subframe of the slot in which PUSCH or PUCCH is transmitted. This violates the conditions for performing joint channel estimation.

Therefore, including the above issues, the present disclosure proposes a method of inter-slot bundling and inter-slot frequency hopping for joint channel estimation suitable for coverage enhancement.

Specifically, the present disclosure proposes a method for determining/configuring/defining the time-domain window size for inter-slot bundling (hereinafter, a first embodiment), and a method for configuring/defining an inter-slot frequency hopping boundary for inter-slot bundling (hereinafter, a second embodiment).

Hereinafter, the embodiments described in the present disclosure are only divided for convenience of explanation, and it goes without saying that some methods and/or some configurations of one embodiment may be substituted with methods and/or configurations of other embodiments, or may be applied in combination with each other.

The present disclosure is described from the perspective of a physical uplink shared channel (PUSCH) transmission, but the method proposed in the present disclosure may be applied not only to PUSCH but also to transmission of other channels such as a physical uplink control channel (PUCCH), a physical downlink shared channel (PDSCH), and a physical downlink control channel (PDCCH).

Slots, subframes, frames, etc. mentioned in the embodiments described in the present disclosure may correspond to specific examples of certain time units used in a wireless communication system. That is, when applying the methods proposed in the present disclosure, time units, etc. may be replaced with other time units applied in another wireless communication system.

In the present disclosure, L1 signaling may refer to DCI-based dynamic signaling between the base station and the UE, and L2 signaling may refer to higher layer signaling based on radio resource control (RRC)/medium access control-control element (MAC-CE) between the base station and the UE.

The contents examined above (3GPP system, frame structure, NR system, etc.) may be applied in combination with the methods proposed in the present disclosure, which will be described later, and/or may be supplemented to clarify the technical characteristics of the methods proposed in the present disclosure.

Additional advantages, objects and features of the invention will be set forth in part in the following description, and in part will be apparent to those skilled in the art upon review of the following, or may be learned from embodiments of the present disclosure. The objects and other advantages of the present disclosure may be realized and achieved by the structure particularly pointed out in the description and claims set forth in the present disclosure as well as in the accompanying drawings.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

Additionally, parentheses used in the present disclosure may mean "for example." Specifically, when "control information (PDCCH)" is indicated, "PDCCH" may be proposed as an example of "control information." In other words, "control information" in the present disclosure is not limited to "PDCCH," and "PDDCH" may be proposed as an example of "control information." Additionally, even when "control information (i.e. PDCCH)" is indicated, "PDCCH" may be proposed as an example of "control information."

Technical features described individually in one drawing in the present disclosure may be implemented individually or simultaneously.

The following drawings are prepared to explain a specific example of the present disclosure. Since the names of specific devices or specific signals/messages/fields described in the drawings are provided as examples, the technical features of the present disclosure are not limited to the specific names used in the drawings below.

The effects that can be achieved through specific examples of the present disclosure are not limited to the listed effects. For example, there may be various technical effects that a person having ordinary skill in the related art can understand or derive from the present disclosure. Accordingly, the specific effects of the present disclosure are not limited to those explicitly described in the present disclosure, and may include various effects that can be understood or derived from the technical features of the present disclosure.

First, it will be examined from a first embodiment.

First Embodiment

In the present embodiment a method for determining/ configuring/defining a time-domain window size for inter-slot bundling will be examined.

The methods described below are separated for convenience of explanation, and it goes without saying that the configuration of one method can be replaced with the configuration of another method or applied in combination with each other.

The method proposed in the present disclosure is described assuming PUSCH repetition, but may be equally applied to PUCCH repetition.

The definition of time-domain window size for inter-slot bundling is being discussed in RAN1. Here, inter-slot bundling may mean a continuous and/or discontinuous transmission occasion in which phase and/or power continuity is guaranteed for the purpose of joint channel estimation for PUSCH/PUCCH, which the UE is configured and transmits the repetition. In other words, inter-slot bundling may mean continuous and/or discontinuous transmission occasions in which the same phase and transmission power are guaranteed for PUSCH/PUCCH, which the UE is configured and transmits the repetition. And/or, inter-slot bundling may be referred to as DMRS bundling.

And/or, the time-domain window size for inter-slot bundling/inter-slot bundling may be a value reported according to the capability of the UE or the channel status of the UE. And/or, the time-domain window size for inter-slot bundling/inter-slot bundling may be a value indicated by the base station (e.g. gNB). If the base station is indicated to this, the following methods may be considered.

(Method 1-1)—Indication Via RRC/MAC-CE/DCI

The time-domain window size is a value depending on the channel of the UE and may be a UE-specific value. And/or, the time-domain window size may be a cell-specific value for resource management of the base station (e.g. gNB).

If the time-domain window size is a cell-specific value, the time-domain window size may be a value given semi-statically as radio resource control (RRC)/medium access control-control element (MAC-CE), etc.

If the time-domain window size is a UE-specific value, the UE may be configured or receive the candidate list of the time-domain window using RRC/MAC-CE, etc. And/or, the UE may be designated/indicated a value corresponding to the UE through downlink control information (DCI) in the list.

And/or, the time-domain window and/or time-domain window size may be received/configured through RRC signaling.

And/or, the time-domain window and/or time-domain window size may be indicated only by DCI for the purpose of dynamic indication. And/or, 2^N time-domain windows may be indicated using N bit DCI according to prior agreement.

(Method 1-2)—Indication/Configuration/Determination Based on Repetition Size

For the purpose of indicating a relatively small time-domain window in low repetition, and a relatively large time-domain window in high repetition, the time-domain window may be indicated/configured/determined based on the number of repetitions. For example, the time-domain window may be determined based on the time duration of consecutive slots of repetition.

For example, when repetition is indicated N times, the time-domain window may be indicated as a value of $\lfloor N/M \rfloor$ or $\lceil N/M \rceil$, etc. through a pre-agreed value M. Here, M may be indicated to the UE through RRC/MAC-CE/DCI, etc. Alternatively, M may be a UE-specific value or a cell-specific value.

(Method 1-3)—Indication Based on the Total Number of Slots

Transmit block over multiple slot (TBoMS) is currently being discussed in coverage enhancement of RAN1. TBoMS may mean mapping one transport block (TB) to multiple slots. And/or, TBoMS may mean a bundle of multiple transmission occasions, or may be treated as one transmission occasion, so one transmission may correspond to multiple slots.

In this case, the time-domain window for joint channel estimation/inter-slot bundling/DMRS bundling may be designated in the same way as the TBoMS unit. And/or, the time-domain window may be designated by an operation using the number of slots in TBoMS.

(Method 1-4)—Classification/Indication/Configuration Based on Frequency Resources For smooth operation in terms of resource management of a base station (e.g. gNB), different joint channel estimation windows (or time domain windows) may be assigned depending on frequency resources.

For example, different time-domain window and/or time-domain window size and/or time-domain window values may be indicated/configured/defined depending on FR1 (Frequency Range 1) and FR2 (Frequency Range 2). And/or, in additional detail, it may be considered that the joint channel estimation window is configured differently depending on the band.

And/or, configuration of the time-domain window according to this frequency may be made implicitly or explicitly simultaneously with configuration of the uplink-bandwidth part (UL-BWP) of the UE. For example, it may be considered that UL-BWP includes time-domain window information for joint channel estimation/inter-slot bundling/DMRS bundling.

And/or, in order to multiplex UEs with the same hopping pattern, the time-domain window may be classified/indicated/configured based on frequency resources.

(Method 1-5)—Adaptive Structure Based on TDD Structure

Configuration of a different number of time-domain windows may be considered based on the slot format configuration of the UE. In other words, it may be considered to be configured according to the number of downlink, flexible, and uplink slots in the subframe. This may be a value based on the slot format set by radio resource control (RRC), or may be indicated by being included in a value indicated by DCI.

Second Embodiment

In the present embodiment, a method of configuring/defining an inter-slot frequency hopping boundary for inter-slot bundling will be examined.

The methods described below are separated for convenience of explanation, and it goes without saying that the configuration of one method can be replaced with the configuration of another method or applied in combination with each other.

The UE may be configured for inter-slot bundling/DMRS bundling that performs joint channel estimation to improve channel estimation performance. And/or, the UE may transmit while maintaining phase, power, timing advance, etc. across multiple slots for the purpose of inter-slot bundling/DMRS bundling by indicating to the base station (e.g. gNB) without being configured for inter-slot bundling/DMRS bundling.

And/or, at the same time, the UE may be configured for inter-slot frequency hopping for the purpose of channel diversity gain, etc. In this case, according to the existing inter-slot frequency hopping rule, one of the two PRBs may be selected and transmission may be performed depending on whether the slot index within the subframe is an odd number or an even number. This violates the conditions for joint channel estimation. In other words, transmission characteristics may change in the time domain window.

Therefore, enhancement for this is essential, and the second embodiment proposes the following method. Hereinafter, in the present disclosure, 'time domain window' may also be referred to as 'CH window'. And/or, in the present disclosure, 'boundary', 'interval', and 'length' may be applied as replacements for each other.

(Method 2-1)—Always Determining the Hopping Interval and CH Window to be the Same.

The UE may determine that the time domain window for joint channel estimation/inter-slot bundling/DMRS bundling configured by the above-mentioned methods is equal to the frequency hopping boundary. The following may be considered as methods to do so. When the time-domain window for joint channel estimation/inter-slot bundling/DMRS bundling is W, the resource block (RB) (or start RB) of the transmission occasion may be determined by replacing Equations 4 to 5 of the predefined specification (e.g. 3GPP TS 38.214, subclause 6.3.1, 6.3.2) with Equation 6.

[Equation 6]

$$RB_{start}(n_s^\mu) = \begin{cases} RB_{start} & \lfloor n_s^\mu / W \rfloor \bmod 2 = 0 \\ (RB_{start} + RB_{offset}) \bmod N_{BWP}^{size} & \lfloor n_s^\mu / W \rfloor \bmod 2 = 1 \end{cases}$$

Here, if the time domain window W is configured by the method described above, the corresponding value may be applied, and if it is not configured, RB may be determined/calculated based on W=1. And/or, the corresponding method may be applied when the time domain window W is cell-specific.

And/or, W may mean the size of the time domain window. For example, W may be configured in slot units. And/or, W may be configured as the number of slots.

27

28

(Method 2-2)—Configuring Hopping Interval as a Multiple of CH Window Size

Unlike the case mentioned above, time domain window W may be a UE-specific value. That is, when W is different between different UEs within a cell, a method of adjusting the frequency hopping boundary can be considered for the convenience of multi-user resource management of the base station (e.g. gNB).

In this case, a value W2 that determines the hopping boundary of UEs for which cell-specific bundling is indicated may be additionally given. And/or, W2 may be indicated to the UE as RRC/MAC-CE/DCI, etc. And/or, when W2 is given as a single value, it may be given in the RRC connection stage of the UE.

And/or, if the frequency hopping boundary of the UE is configured as a multiple of the time domain window, the multiple may be given. For example, if the time domain window of the UE is W, m is given and the frequency hopping boundary may be configured/defined or obtained by mW=W2 agreed upon in advance. In this way, etc., the physical resource block (PRB) (or start RB) of the transmission occasion for frequency hopping of the UE given W2 may be defined as in Equation 7.

$$RB_{start}(n_s^\mu) = \begin{cases} RB_{start} & \lfloor n_s^\mu / W_2 \rfloor \bmod 2 = 0 \\ (RB_{start} + RB_{offset}) \bmod N_{BWP}^{size} & \lfloor n_s^\mu / W_2 \rfloor \bmod 2 = 1 \end{cases}$$

[Equation 7]

Hereinafter, in the present disclosure, the first to second embodiments or other embodiments will be examined from a standard perspective.

Hereinafter, the content of the present disclosure may supplement all or part of the above-described embodiments (i.e. first to second embodiments), or may be applied together with all or part of the embodiments, or may be applied by replacing all or part of the embodiments. Alternatively, hereinafter, the contents of the present disclosure may be applied separately from the first to second embodiments.

In the present disclosure, 'first to second embodiments' may mean including the following proposed content/method.

Regarding inter-slot frequency hopping and DMRS bundling, an agreement was made as shown in Table 8 in RAN1 #107-e, and the remaining FFS points should also be discussed.

First, it is necessary to define the determination of the frequency hopping pattern. Both the existing PUSCH and PUCCH are based on the same rules, but there are differences in what is described in the standard document.

For frequency hopping of PUSCH, a start RB is applied when the slot index is an even number, and an offset for the start RB is applied when the slot index is an odd number.

In the case of PUCCH, startingPRB is applied if the slot index is an even number, and secondHopPRB is applied if the slot index is an odd number. That is, the frequency hop is determined depending on whether the physical slot index is even or odd. The frequency hops are determined based on the physical slot index, and for simplicity it is best to extend the same rule.

In addition, if the hopping boundaries between UEs are not aligned, all UEs performing frequency hopping occupy two RBs, which is not desirable in terms of resource management. In other words, a method that can adjust hopping boundaries between the UEs by considering multi-user multiplexing is desirable. This is possible when the hopping pattern is determined by the physical slot index.

Therefore, according to the method proposed in the present disclosure, the frequency hopping pattern for inter-slot frequency hopping may be determined only by the physical slot index.

Second, determination of the frequency hopping pattern of PUCCH and PUSCH may need to be based on a unified method. Defining a frequency hopping pattern using only a physical slot index may be for multi-user multiplexing. To achieve this, the hopping boundaries between users may need to match. However, because the configured time domain window (TDW) of PUSCH and PUCCH is configured separately, the hopping window (or TDW) of PUCCH and PUSCH may be different. To solve this, multi-user multiplexing may be achieved by not pairing different channels. That is, PUSCH and PUCCH may not be paired with each other.

Therefore, according to the method proposed in the present disclosure, frequency hopping pattern determination for PUCCH and PUSCH may be based on the same rule. And/or, the size of each frequency hopping window for PUSCH and PUCCH may be the same or different depending on each configuration.

It was agreed to support separate RRC configuration for the hopping interval and configured TDW length. Considering this, the specific method for determining the frequency hop of PUSCH is as follows.

TABLE 8

| Agreement |
| --- |
| For the interaction between inter-slot frequency hopping and DMRS bundling for PUCCH/PUSCH repetitions, a UE performs the "hopping intervals determination", "configured TDW determination", and "actual TDW determination" in a sequential ordering, based on the following option 1. |

Option 1: "hopping intervals determination" –> "configured TDW determination" –> "actual TDW determination"
 DMRS bundling shall be restarted at the beginning of each frequency hop
 DMRS bundling is per actual TDW
 FFS: Frequency hopping pattern is determined by physical slot indices.
  FFS: different FH pattern determination for PUCCH and PUSCH
  FFS: details of FH pattern design
 Support separate RRC configuration(s) for hopping interval and configured TDW length.
  if hopping interval is not configured, the default hopping interval is the same as the configured TDW length
   FFS: if both hopping interval and TDW length are not configured
  Note: hopping interval is only determined by the configuration of hopping interval if hopping interval is configured When inter slot frequency hopping is configured and the hopping interval for PUSCH W (e.g. HoppingInterval-PUSCH) is configured, the resource block (RB) of the transmission occasion in the $$n_s^\mu$$

th slot may be configured by Equation 8. That is, start RB or start RB+offset RB may be applied depending on whether the slot index divided by the hopping interval for joint channel estimation of PUSCH is even or odd.

The same rule may be applied to PUCCH. That is, startingPRB and secondHopPRB may have to be applied depending on whether the value of dividing the slot index by the hopping interval for joint channel estimation of PUCCH, described as HoppingIntervalPUCCH, is even or odd. At this time, if the configured TDW of the PUCCH is not configured according to the PUCCH format, the hopping interval for joint channel estimation of the PUCCH does not need to be configured for each format. As described above, it may not be desirable to have different boundaries for each format in consideration of multi-user multiplexing. Therefore, the hopping interval of PUCCH may also have to be applied regardless of format.

The last FFS point is the default UE behavior when hopping interval and TDW are not configured, but joint channel estimation and frequency hopping are enabled. It is natural to think that the operation of the UE is clear because the value of the default configured TDW is defined even if neither the hopping interval nor the TDW length are configured. That is, when joint channel estimation is enabled and hopping is indicated without a hopping interval and configured TDW, the default configured TDW value may be the hopping interval.

Therefore, according to the method proposed in the present disclosure, when joint channel estimation is enabled and frequency hopping is indicated without a hopping interval and configured TDW, the default value for the configured TDW hopping interval may be applied as the default value for the hopping interval.

And/or, according to the method proposed in the present disclosure, the following contents may be proposed in the technical specification (e.g., 3GPP TS38.214).

Frequency Hopping for PUSCH Repetition Type A

In case of inter-slot frequency hopping and when PUSCH-DMRS-Bundling is not enabled, during slot $$n_s^\mu,$$

start RB may be given by Equation 8.

[Equation 8]

$$RB_{start}(n_s^\mu) = \begin{cases} RB_{start} & n_s^\mu \bmod 2 = 0 \\ (RB_{start} + RB_{offset}) \bmod N_{BWP}^{size} & n_s^\mu \bmod 2 = 1 \end{cases}$$

Here, $$n_s^\mu$$

is the current slot number within the radio frame where multi-slot PUSCH transmission can occur, and $RB_{start}$ is the start RB in the UL BWP calculated from the resource block assignment information of resource allocation type 1 (described in 3GPP TS 38.214, clause 6.1.2.2.2). $RB_{offset}$ is the frequency offset in RB units between two frequency hops.

In the case of inter-slot frequency hopping and when PUSCH-DMRS-Bundling is enabled, the start RB during slot $$n_s^\mu$$

may be given by Equation 9.

[Equation 9]

$$RB_{start}(n_s^\mu) = \begin{cases} RB_{start} & \lfloor n_s^\mu / W \rfloor \bmod 2 = 0 \\ (RB_{start} + RB_{offset}) \bmod N_{BWP}^{size} & \lfloor n_s^\mu / W \rfloor \bmod 2 = 1 \end{cases}$$

Here, $$n_s^\mu$$

is the current slot number within the radio frame where multi-slot PUSCH transmission can occur, and $RB_{start}$ is the start RB in the UL BWP calculated from the resource block assignment information of resource allocation type 1 (described in 3GPP TS 38.214, clause 6.1.2.2.2). And, $RB_{offset}$ is the frequency offset in RB units between two frequency hops.

And, if HoppingIntervalPUSCH is (configured), or if HoppingIntervalPUSCH is not configured, if PUSCH-Time-DomainWindowLength is (configured), or if PUSCH-Time-DomainWindowLength is not configured and HoppingInterval-valPUSCH is not configured, W may be calculated as min([maxDMRS-BundlingDuration], M). Here, M is the time duration in consecutive slots of N·K PUSCH transmissions.

Here, in the case of PUSCH transmission of PUSCH repetition Type A, N=1 and K is the number of repetitions, as defined in a predefined specification (e.g. 3GPP TS 38.214, clause 6.1.2.1).

In the case of PUSCH transmission of PUSCH repetition Type B, N=1 and K is the number of nominal repetitions, as defined in a predefined specification (e.g. 3GPP TS 38.214, clause 6.1.2.1).

In the case of PUSCH transmission of TB processing across multiple slots, N is the number of slots used for TBS determination, and K is the number of repetitions of the number of slots N used for TBS determination, as defined in a predefined specification (e.g. 3GPP TS 38.214, clause 6.1.2.1).

And/or, according to the method proposed in the present disclosure, the following contents may be proposed in the technical specification (e.g. 3GPP TS38.213).

PUCCH Repetition Procedure

In the case of $$N_{PUCCH}^{repeat} > 1,$$

31

The UE repeats PUCCH transmission with UCI across $$N_{PUCCH}^{repeat}$$

slots.
PUCCH transmission in each of the $$N_{PUCCH}^{repeat}$$

slots has the same number of consecutive symbols as provided by nrofSymbols.
PUCCH transmission in each of the $$N_{PUCCH}^{repeat}$$

slots has the same first symbol as provided by startingSymbolIndex if subslotLengthForPUCCH is not provided. Otherwise, it has the symbol by mod (startingSymbolIndex, subslotLengthForPUCCH).
The UE may be configured by interslotFrequencyHopping whether to perform frequency hopping for PUCCH transmissions in different slots.
When the UE is configured to perform frequency hopping for PUCCH transmission across different slots and PUCCH-DMRS-Bundling is not enabled, the UE performs frequency hopping for each slot. And/or, the UE transmits a PUSCCH starting from the first PRB provided by startingPRB in even slots and transmits a PUCCH starting from the second PRB provided by secondHopPRB in odd slots. And/or, the slot indicated to the UE for first PUCCH transmission has number 0, and until the UE transmits PUCCH in $$N_{PUCCH}^{repeat}$$

slots, each subsequent slot is counted regardless of whether the UE transmits PUCCH in the corresponding slot. And/or, the UE is not expected to be configured to perform frequency hopping for PUCCH transmission within the slot.
When the UE is configured to perform frequency hopping for PUCCH transmission across different slots and PUCCH-DMRS-Bundling is enabled, the UE performs frequency hopping per W slots. Here, if HoppingIntervalPUCCH is (configured), or if HoppingInterval-PUCCH is not configured, if PUCCH-TimeDomain-WindowLength is (configured), or if TimeDomainWindowLength is not configured and HoppingIntervalPUCCH is not configured, W may be calculated as min ([maxDMRS-BundlingDuration], M). Here, M is the time duration in consecutive slots from the first slot determined for PUCCH transmission of the PUCCH repetition to the last slot determined for PUCCH transmission of the PUCCH repetition. And/or, the UE transmits PUCCH on the first PRB provided by startingPRB in a slot where $$\lfloor n_s^\mu / W \rfloor$$

is an even number and on the second PRB provided by secondHopPRB in a slot where $$\lfloor n_s^\mu / W \rfloor$$

is an odd number. Here, $$n_s^\mu$$

is the current slot number within the radio frame. The slot indicated to the UE for first PUCCH transmission has number 0, and until the UE transmits PUCCH in $$N_{PUCCH}^{repeat}$$

slots, each subsequent slot is counted regardless of whether the UE transmits PUCCH in the corresponding slot. And/or, the UE is not expected to be configured to perform frequency hopping for PUCCH transmission within the slot.
If the UE is not configured to perform frequency hopping for PUCCH transmission across different slots, and if the UE is configured to perform frequency hopping for PUCCH transmission within one slot, the frequency hopping pattern between the first PRB and the second PRB is the same within each slot.
And/or, there is an agreement as shown in Table 9 in RAN1 #104b-e regarding frequency hopping with inter-slot bundling.

TABLE 9

| Agreements: |
| --- |
| For inter-slot frequency hopping with inter-slot bundling, down select on the following two options:<br>    Option 1: The bundle size (time domain hopping interval) equals to the time domain window size.<br>    Option 2: The bundle size (time domain hopping interval) can be different from the time domain window size.<br>      FFS: Whether the bundle size (time domain hopping interval) is explicitly configured or implicitly determined.<br>      FFS: Whether/How the bundle size (time domain hopping interval) is defined separately for FDD and TDD.<br>      FFS: relation between the bundle size (time domain hopping interval) and the time domain window size |

Considering the RAN1 #107-e agreement, which is arranged in the order of "hopping intervals determination-"→"configured TDW determination" and "actual TDW determination", Option 2 is naturally supported. It is also necessary to organize FFS points. That is, the bundle size and time domain hopping interval are explicitly and independently configured, and the bundle size is not configured separately for FDD and TDD.

According to the method proposed in the present disclosure, the bundle size may be the same as or different from the time domain window size.

Figure 11:
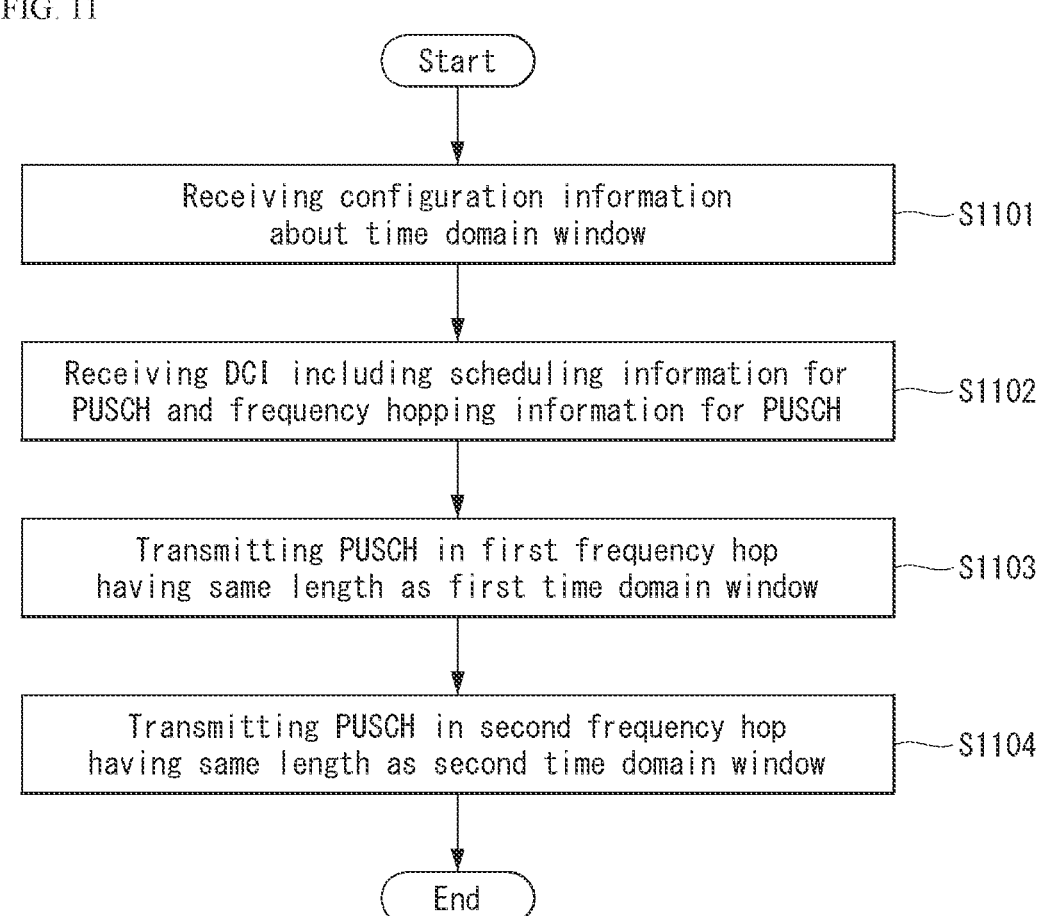
FIG. 11 is a flowchart for explaining an operation method of a UE proposed in the present disclosure.

FIG. 11 is a flowchart for explaining an operation method of a UE proposed in the present disclosure.

Referring to FIG. 11, first, the UE (100/200 in FIGS. 13 to 16) may receive configuration information related to a time domain window from the base station in step S1101. For example, the configuration information may include information related to the length/boundary/interval of the time domain window.

And/or, the time domain window may include one or more time domain windows. Alternatively, the time domain window may be replaced by one or more time domain windows. For example, the time domain window may include a first time domain window and a second time domain window.

And/or, the time domain window may be a time domain window for demodulation reference signal (DMRS) bundling or inter-slot bundling or joint channel estimation.

And/or, within the time domain window, the same phase and transmission power may be maintained/guaranteed.

And/or, the time domain window may be configured based on the number of PUSCH repeated transmissions. For example, when the number of PUCCH repeated transmissions is configured/indicated as 'N', the length of the time domain window $\lfloor N/M \rfloor$ may be indicated/determined/configured to $\lceil N/M \rceil$. Here, 'M' may be a preconfigured value. And/or, 'M' may be indicated through RRC/MAC-CE/DCI, etc. And/or 'M' may be a UE-specific value or a cell-specific value.

For example, the operation of receiving the configuration information by the UE in step S1101 may be implemented by the device of FIGS. 13 to 16 described above. For example, referring to FIG. 14, one or more processors 102/202 may control one or more memories 104/204 and/or one or more transceivers 106/206, etc. to receive the configuration information.

And/or, the UE (100/200 in FIGS. 13 to 16) may receive downlink control information (DCI) including scheduling information for the PUSCH and frequency hopping information for the PUSCH from the base station in step S1102. And/or, PUSCH repetition or PUSCH repeated transmissions may be scheduled by the DCI.

For example, scheduling information may include information related to time resources and/or information related to frequency resources. And/or, the frequency hopping information may be information indicating PUSCH frequency hopping. For example, the UE may transmit the PUSCH in a first frequency hop and a second frequency hop based on the frequency hopping information.

And/or, (based on the DCI) the PUSCH may be transmitted based on frequency hopping over multiple slots.

The operation method of FIG. 11 is described focusing on an example in which frequency hopping is indicated by DCI, but frequency hopping may be configured/indicated in various ways. For specific details regarding this, the contents of the present disclosure described above may be referred to.

For example, the operation of receiving DCI by the UE in step S1102 may be implemented by the device of FIGS. 13 to 16 described above. For example, referring to FIG. 14, one or more processors 102/202 may control one or more memories 104/204 and/or one or more transceivers 106/206, etc. to receive the DCI.

And/or, the UE (100/200 in FIGS. 13 to 16) may transmit the PUSCH to the base station in the first frequency hop having the same length/boundary/interval as the first time domain window in step S1103.

For example, the operation of transmitting the PUSCH by the UE in step S1103 may be implemented by the device of FIGS. 13 to 16 described above. For example, referring to FIG. 14, one or more processors 102/202 may control one or more memories 104/204 and/or one or more transceivers 106/206, etc. to transmit the PUSCH.

And/or, the UE (100/200 in FIGS. 13 to 16) may transmit the PUSCH to the base station in a second frequency hop having the same length/boundary/interval as the second time domain window in step S1104. And/or, the first frequency hop may be an even-numbered hop and the second frequency hop may be an odd-numbered hop.

For example, the length/interval/boundary of the first frequency hop may be configured to be the same as the first time domain window. And/or, the length/interval/boundary of the second frequency hop may be configured to be the same as the second time domain window.

And/or, the boundary of the first frequency hop may be the same as the first time domain window. And/or, the boundary of the second frequency hop may be the same as the second time domain window.

And/or, the length/interval/boundary of the first frequency hop and the second frequency hop may be determined based on the length/interval/boundary of the time domain window and the slot number within the radio frame. And/or, the start resource block (RB) of the second frequency hop may be determined based on the start RB and frequency offset of the first frequency hop.

And/or, the start resource block (RB) during the slot $$n_s^\mu$$

for PUSCH may be determined based on the following equation.

$$RB_{start}(n_s^\mu) = \begin{cases} RB_{start} & \lfloor n_s^\mu/W \rfloor \bmod 2 = 0 \\ (RB_{start} + RB_{offset}) \bmod N_{BWP}^{size} & \lfloor n_s^\mu/W \rfloor \bmod 2 = 1 \end{cases} \text{[Equation]}$$

Where, $RB_{start}$ may represent a start RB of the first frequency hop, $RB_{offset}$ may represent a frequency offset between the first frequency hop and the second frequency hop, $$N_{BWP}^{size}$$

may represent a size of an uplink bandwidth part (BWP), and W may represent a length of the time domain window.

For example, the operation of transmitting the PUSCH by the UE in step S1104 may be implemented by the device of FIGS. 13 to 16 described above. For example, referring to FIG. 14, one or more processors 102/202 may control one or more memories 104/204 and/or one or more transceivers 106/206, etc. to transmit the PUSCH.

The operation method of FIG. 11 is described with a focus on PUSCH transmission, but it goes without saying that it may also be applied to the PUCCH.

Since the operation of the UE described with reference to FIG. 11 is the same as the operation of the UE described with reference to FIGS. 1 to 10 (e.g. first to second embodiments), detailed descriptions other than this are omitted.

The signaling and operations described above may be implemented by devices to be described below (e.g. FIGS. 13 to 16). For example, the signaling and operations described above may be processed by one or more processors of FIGS. 13 to 16, and the signaling and operations described above may be stored in memory in the form of instructions/programs (e.g. instructions, executable code) for driving at least one processor of FIGS. 13 to 16.

For example, a processing apparatus configured to control a user equipment (UE) to transmit a PUSCH in a wireless communication system, the processing apparatus may comprise at least one processor, and at least one memory operably connected to the at least one processor, and storing instructions for performing operations based on being executed by the at least one processor, wherein the operations may include receiving configuration information related to a time domain window from a base station, receiving DCI including scheduling information for the PUSCH and frequency hopping information for the PUSCH from the base station, transmitting the PUSCH to the base station in a first frequency hop having the same length as a first time domain window, and transmitting the PUSCH to the base station in a second frequency hop having the same length as a second time domain window.

For example, a computer-readable storage medium storing at least one instruction, wherein the least one instruction causes at least one processor to control operations based on being executed by the at least one processor, wherein the operations may include receiving configuration information related to a time domain window from a base station, receiving DCI including scheduling information for a PUSCH and frequency hopping information for the PUSCH from the base station, transmitting the PUSCH to the base station in a first frequency hop having the same length as a first time domain window, and transmitting the PUSCH to the base station in a second frequency hop having the same length as a second time domain window.

FIG. 12 is a flowchart for explaining an operation method of a base station proposed in the present disclosure.

Referring to FIG. 12, first, the base station (100/200 in FIGS. 13 to 16) may transmit configuration information related to a time domain window to the UE in step S1201. For example, the configuration information may include information related to the length/boundary/interval of the time domain window.

And/or, the time domain window may include one or more time domain windows. Alternatively, the time domain window may be replaced by one or more time domain windows. For example, the time domain window may include a first time domain window and a second time domain window.

And/or, the time domain window may be a time domain window for demodulation reference signal (DMRS) bundling or inter-slot bundling or joint channel estimation.

And/or, within the time domain window, the same phase and transmission power may be maintained/guaranteed.

And/or, the time domain window may be configured based on the number of PUSCH repeated transmissions. For example, when the number of PUCCH repeated transmissions is configured/indicated as 'N', the length of the time domain window ⌊N/M⌋ may be indicated/determined/configured to ⌈N/M⌉. Here, 'M' may be a preconfigured value. And/or, 'M' may be indicated through RRC/MAC-CE/DCI, etc. And/or 'M' may be a UE-specific value or a cell-specific value.

For example, the operation of transmitting configuration information by the base station in step S1201 may be implemented by the device of FIGS. 13 to 16 described above. For example, referring to FIG. 14, one or more processors 102/202 may control one or more memories 104/204 and/or one or more transceivers 106/206, etc. to transmit the configuration information.

And/or, the base station (100/200 in FIGS. 13 to 16) may transmit downlink control information (DCI) including scheduling information for the PUSCH and frequency hopping information for the PUSCH to the UE in step S1202. And/or, PUSCH repetition or PUSCH repeated transmissions may be scheduled by the DCI.

For example, scheduling information may include information related to time resources and/or information related to frequency resources. And/or, the frequency hopping information may be information indicating PUSCH frequency hopping. For example, the base station may receive the PUSCH in a first frequency hop and a second frequency hop based on the frequency hopping information.

And/or, (based on the DCI) the PUSCH may be received based on frequency hopping over multiple slots.

The operation method of FIG. 12 is described focusing on an example in which frequency hopping is indicated by DCI, but frequency hopping may be configured/indicated in various ways. For specific details regarding this, the contents of the present disclosure described above may be referred to.

For example, the operation of transmitting the DCI by the base station in step S1202 may be implemented by the device of FIGS. 13 to 16 described above. For example, referring to FIG. 14, one or more processors 102/202 may control one or more memories 104/204 and/or one or more transceivers 106/206, etc. to transmit the DCI.

And/or, the base station (100/200 in FIGS. 13 to 16) may receive the PUSCH from the UE in the first frequency hop having the same length/boundary/interval as the first time domain window in step S1203.

For example, the operation of receiving PUSCH by the base station in step S1203 may be implemented by the devices of FIGS. 13 to 16 described above. For example, referring to FIG. 14, one or more processors 102/202 may control one or more memories 104/204 and/or one or more transceivers 106/206, etc. to receive the PUSCH.

And/or, the base station (100/200 in FIGS. 13 to 16) may receive the PUSCH from the UE in a second frequency hop having the same length/boundary/interval as the second time domain window in step S1204. And/or, the first frequency hop may be an even-numbered hop and the second frequency hop may be an odd-numbered hop.

For example, the length/interval/boundary of the first frequency hop may be configured to be the same as the first time domain window. And/or, the length/interval/boundary of the second frequency hop may be configured to be the same as the second time domain window. For example, the boundary of the first frequency hop may be the same as the first time domain window. And/or, the boundary of the second frequency hop may be the same as the second time domain window.

And/or, the length/interval/boundary of the first frequency hop and the second frequency hop may be determined based on the length/interval/boundary of the time domain window and the slot number within the radio frame. And/or, the start resource block (RB) of the second frequency hop may be determined based on the start RB and frequency offset of the first frequency hop.

And/or, the start resource block (RB) during the slot $$n_s^\mu$$

for PUSCH may be determined based on the following equation.

$$RB_{start}(n_s^\mu) = \begin{cases} RB_{start} & \lfloor n_s^\mu/W \rfloor \bmod 2 = 0 \quad \text{[Equation]} \\ (RB_{start} + RB_{offset}) \bmod N_{BWP}^{size} & \lfloor n_s^\mu/W \rfloor \bmod 2 = 1 \end{cases}$$

Where, $RB_{start}$ may represent a start RB of the first frequency hop, $RB_{offset}$ may represent a frequency offset between the first frequency hop and the second frequency hop, $$N_{BWP}^{size}$$

BWP may represent a size of an uplink bandwidth part (BWP), and W may represent a length of the time domain window.

For example, the operation of receiving PUSCH by the base station in step S1204 may be implemented by the devices of FIGS. 13 to 16 described above. For example, referring to FIG. 14, one or more processors 102/202 may control one or more memories 104/204 and/or one or more transceivers 106/206, etc. to receive the PUSCH.

The operation method in FIG. 12 is described focusing on PUSCH transmission, but it goes without saying that it may also be applied to PUCCH.

Since the operation of the base station described with reference to FIG. 12 is the same as the operation of the base station described with reference to FIGS. 1 to 11 (e.g. first to second embodiments), detailed descriptions other than this are omitted.

The signaling and operations described above may be implemented by devices to be described below (e.g. FIGS. 13 to 16). For example, the signaling and operations described above may be processed by one or more processors of FIGS. 13 to 16, and the signaling and operations described above may be stored in memory in the form of instructions/programs (e.g. instructions, executable code) for driving at least one processor of FIGS. 13 to 16.

For example, a processing apparatus configured to control a base station to receive a PUSCH in a wireless communication system, the processing apparatus may comprise at least one processor, and at least one memory operably connected to the at least one processor, and storing instructions for performing operations based on being executed by the at least one processor, wherein the operations may include transmitting configuration information related to a time domain window to a user equipment (UE), transmitting DCI including scheduling information for the PUSCH and frequency hopping information for the PUSCH to the UE, receiving the PUSCH from the UE in a first frequency hop having the same length as a first time domain window, and receiving the PUSCH from the UE in a second frequency hop having the same length as a second time domain window.

For example, a computer-readable storage medium storing at least one instruction, wherein the least one instruction causes at least one processor to control operations based on being executed by the at least one processor, wherein the operations may include transmitting configuration information related to a time domain window to a user equipment (UE), transmitting DCI including scheduling information for a PUSCH and frequency hopping information for the PUSCH to the UE, receiving the PUSCH from the UE in a first frequency hop having the same length as a first time domain window, and receiving the PUSCH from the UE in a second frequency hop having the same length as a second time domain window.

Example of Communication System Applied to Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 13:
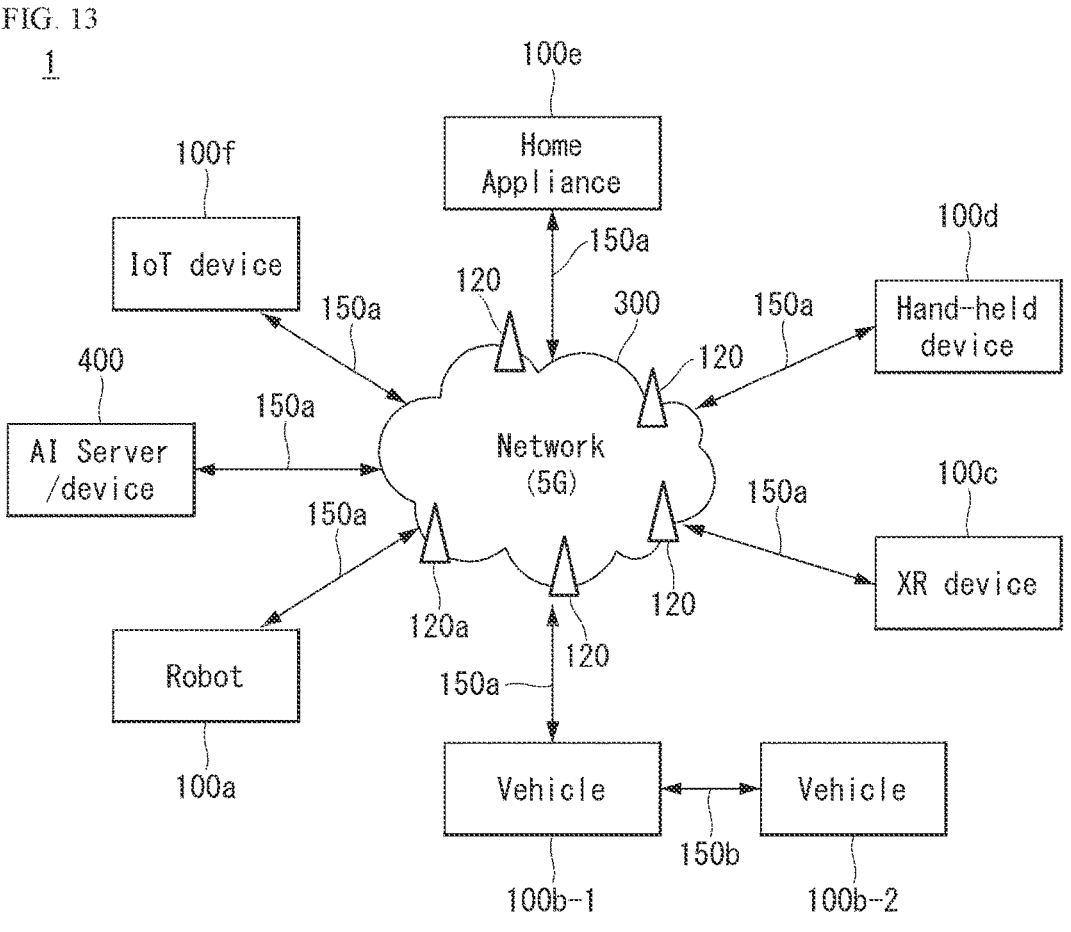
FIG. 13 illustrates a communication system 1 applied to the present disclosure.

FIG. 13 illustrates a communication system 1 applied to the present disclosure.

Referring to FIG. 13, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an extended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g., relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Example of Wireless Device Applied to the Present Disclosure.

Figure 14:
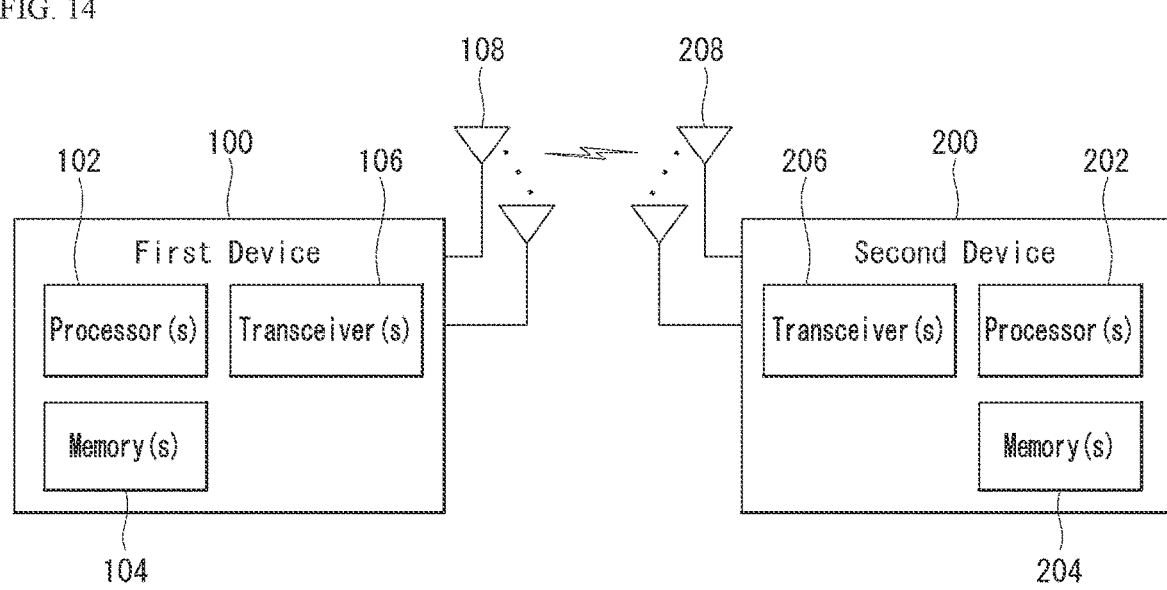
FIG. 14 illustrates a wireless device applicable to the present disclosure.

FIG. 14 illustrates wireless devices applicable to the present disclosure.

Referring to FIG. 14, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 13.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. From RF band signals into baseband signals in order to process received user data, control information, radio signals/channels, etc. using the one or more processors 102 and 202. The one or more transceivers 106 and 206 may convert the user data, control information, radio signals/channels, etc. Processed using the one or more processors 102 and 202 from the base band signals into the RF band signals. To this end, the one or more transceivers 106 and 206 may include (analog) oscillators and/or filters.

Example of Application of Wireless Device Applied to the Present Disclosure

FIG. 15 illustrates another example of a wireless device applied to the present disclosure.

The wireless device may be implemented in various forms according to a use-case/service (refer to FIG. 13). Referring to FIG. 15, wireless devices 100 and 200 may correspond to the wireless devices 100 and 200 of FIG. 14 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 14. For example, the transceiver(s) 114 may include the one or more transceivers 106 and 206 and/or the one or more antennas 108 and 208 of FIG. 14. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 13), the vehicles (100b-1 and 100b-2 of FIG. 13), the XR device (100c of FIG. 13), the hand-held device (100d of FIG. 13), the home appliance (100e of FIG. 13), the IoT device (100f of FIG. 13), a digital broadcast terminal, a hologram device, a public safety device, an MTC device, a medicine device, a fintech device (or a finance device), a security device, a climate/environment device, the AI server/device (400 of FIG. 13), the BSs (200 of FIG. 13), a network node, etc. The wireless device may be used in a mobile or fixed place according to a use-example/service.

In FIG. 15, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Example of Hand-Held Device Applied to the Present Disclosure

Figure 16:
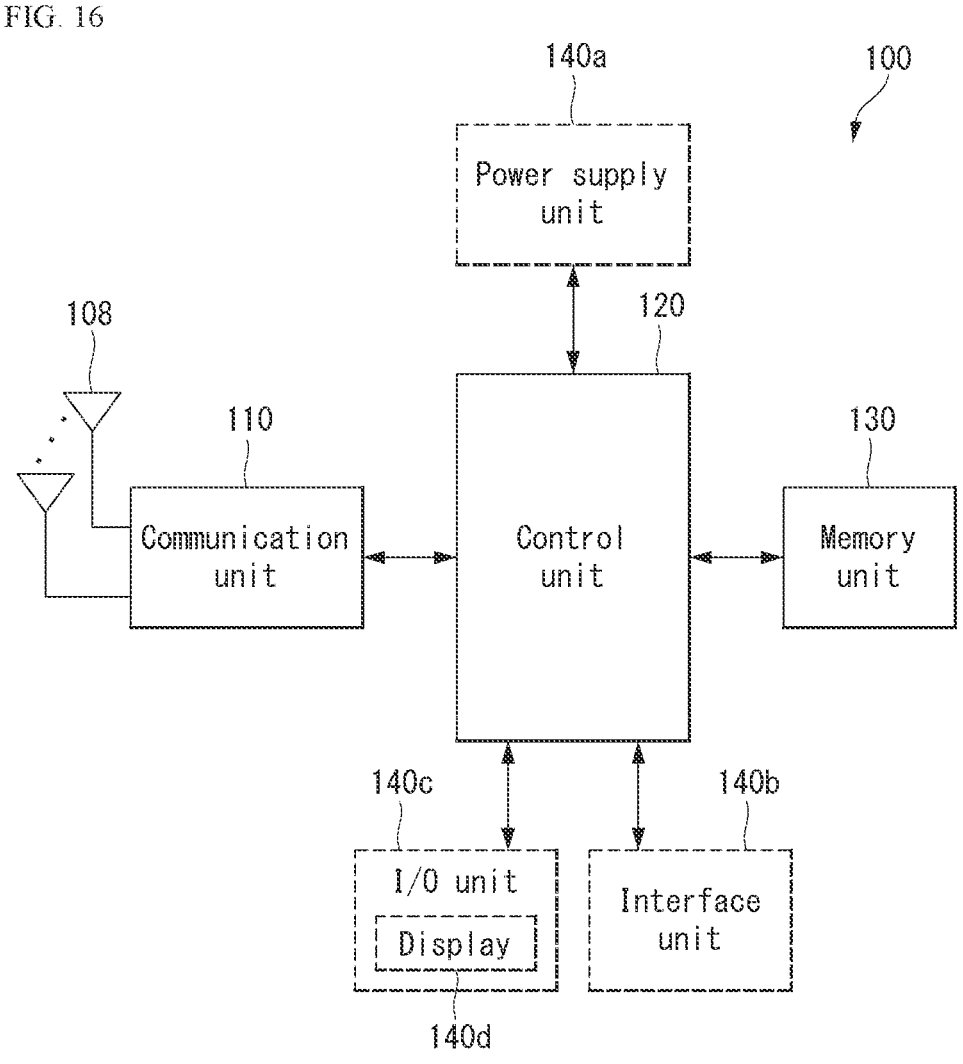
FIG. 16 illustrates a portable device applied to the present disclosure.

FIG. 16 illustrates a hand-held device applied to the present disclosure. The hand-held device may include a smartphone, a smart pad, a wearable device (e.g., a smartwatch or a smart glasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 16, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 15, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

Here, the wireless communication technology implemented in the wireless devices 100 and 200 of the disclosure may include the narrowband Internet of Things for low-power communication as well as LTE, NR, and 6G. In this case, e.g., the NB-IoT technology may be an example of low power wide area network (LPWAN) technology, and may be implemented in standards, such as LTE Cat NB1 and/or LTE Cat NB2, and it is not limited to the above-mentioned name. Additionally or alternatively, the wireless communication technology implemented in the wireless devices 100 and 200 of the disclosure may perform communication based on LTE-M technology. In this case, as an example, the LTE-M technology may be an example of LPWAN technology, and may be called by various names, such as enhanced machine type communication (eMTC). For example, LTE-M technology may be implemented as at least any one of various standards, such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the aforementioned name. Additionally or alternatively, the wireless communication technology implemented in the wireless devices 100 and 200 of the disclosure may include at least any one of ZigBee, Bluetooth, and Low Power Wide Area Network (LPWAN) considering low power communication, and it is not limited to the above-mentioned name. For example, the ZigBee technology may create personal area networks (PAN) related to small/low-power digital communication based on various standards, such as IEEE 802.15.4, and it may be called by various names.

The embodiments described above are implemented by combinations of components and features of the present disclosure in predetermined forms. Each component or feature should be considered selectively unless specified separately. Each component or feature may be carried out without being combined with another component or feature. Moreover, some components and/or features are combined with each other and may implement embodiments of the present disclosure. The order of operations described in embodiments of the present disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure may be implemented by various means, for example, hardware, firmware, software, or combinations thereof. When embodiments are implemented by hardware, one embodiment of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure may be implemented by modules, procedures, functions, etc. Performing functions or operations described above. Software code may be stored in a memory and may be driven by a processor. The memory is provided inside or outside the processor and may exchange data with the processor by various well-known means.

It is apparent to those skilled in the art that the present disclosure may be embodied in other specific forms without departing from essential features of the present disclosure. Accordingly, the aforementioned detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

INDUSTRIAL APPLICABILITY

The method for transmitting and receiving the PSSCH in the wireless communication system of the present disclosure has been mainly described as an example applied to the 3GPP LTE/LTE-A system and the 5G system (New RAT system), but in addition, it is possible to apply to various wireless communication systems such as Beyond 5G, 6G, and Beyond 6G.

The invention claimed is:

1. A method comprising:

receiving, by a user equipment (UE) from a base station (BS), configuration information related to a Physical Uplink Shared Channel (PUSCH), wherein the configuration information includes i) DeModulation Reference Signal (DMRS) bundling enable information, ii) information related to a length of a time domain window for a DMRS bundling and iii) a frequency hopping configuration;

receiving, by the UE from the BS, downlink control information (DCI) for scheduling of the PUSCH;

transmitting, by the UE to the BS, the PUSCH based on i) the DMRS bundling enable information and ii) the frequency hopping configuration, wherein, based on that an inter-slot frequency hopping is enabled based on the frequency hopping configuration and the DMRS bundling is enabled by the DMRS bundling enable information:

the number of consecutive slots related to a frequency hopping interval is determined based on the length of the time domain window, wherein the starting resource block (RB) during a slot $$n_s^\mu$$

related to the inter-slot frequency hopping is determined based on, and the $$n_s^\mu$$

is the current slot number within a radio frame, the W is the length of the time domain window and $\lceil\ \rceil$ is a floor function.

2. The method of claim 1, wherein a starting resource block (RB) of a second frequency hop is determind based on a starting RB and a frequency offset for a first frequency hop.

3. The method of claim 1, wherein a first frequency hop is an even-numbered hop, and a second frequency hop is an odd-numbered hop.

4. The method of claim 1, wherein the starting RB during the slot $$n_s^\mu$$

for the PUSCH is determined based on the following equation,

[Equation]

$$RB_{start}(n_s^\mu) = \begin{cases} RB_{start} & \lfloor n_s^\mu / W \rfloor \bmod 2 = 0 \\ (RB_{start} + RB_{offset}) \bmod N_{BWP}^{size} & \lfloor n_s^\mu / W \rfloor \bmod 2 = 1 \end{cases}$$

where, $RB_{start}$ represents a starting RB within an uplink bandwidth part (UL BWP), $RB_{offset}$ represents a frequency offset in RBs between two frequency hops, $$N_{BWP}^{size}$$

represents a size of the UL BWP.

5. The method of claim 1, wherein, within the time domain window, a phase and transmission power are maintained.

6. The method of claim 1, wherein the time domain window is configured based on a number of repeated transmissions of the PUSCH.

7. The method of claim 1, wherein the PUSCH is transmitted based on the inter-slot frequency hopping over a plurality of slots.

8. A user equipment (UE) comprising:

at least one transceiver;

at least one processor; and at least one memory operably connected to the at least one processor, and storing instructions for performing operations based on being executed by the at least one processor, wherein the operations include:

receiving, from a base station (BS), configuration information related to a Physical Uplink Shared Channel (PUSCH), wherein the configuration information includes i) DeModulation Reference Signal (DMRS) bundling enable information, ii) information related to a length of a time domain window for a DMRS bundling and iii) a frequency hopping configuration;

receiving, from the BS, downlink control information (DCI) for scheduling of the PUSCH;

transmitting, to the BS, the PUSCH based on i) the DMRS bundling enable information and ii) the frequency hopping configuration, wherein, based on that an inter-slot frequency hopping is enabled based on the frequency hopping configuration and the DMRS bundling is enabled by the DMRS bundling enable information:

the number of consecutive slots related to a frequency hopping interval is determined based on the length of the time domain window, wherein the starting resource block (RB) during a slot $$n_s^\mu$$

US 12,671,531 B2

47

48 related to the inter-slot frequency hopping is determined based on, and the $$n_s^{\mu}$$

is the current slot number within a radio frame, the W is the length of the time domain window and $\lceil \rceil$ is a floor function.

9. A base station comprising:
at least one transceiver;
at least one processor; and
at least one memory operably connected to the at least one processor, and storing instructions for performing operations based on being executed by the at least one processor,
wherein the operations include:
transmitting, to a user equipment (UE), configuration information related to a Physical Uplink Shared Channel (PUSCH),
wherein the configuration information includes i) DeModulation Reference Signal (DMRS) bundling enable information, ii) information related to a length of a time domain window for a DMRS bundling and iii) a frequency hopping configuration;
transmitting, to the UE, downlink control information (DCI) for scheduling of the PUSCH; and
receiving, from the UE, the PUSCH based on i) the DMRS bundling enable information and ii) the frequency hopping configuration,
wherein, based on that an inter-slot frequency hopping is enabled based on the frequency hopping configuration and the DMRS bundling is enabled by the DMRS bundling enable information:
the number of consecutive slots related to a frequency hopping interval is determined based on the length of the time domain window,
wherein the starting resource block (RB) during a slot $$n_s^{\mu}$$

related to the inter-slot frequency hopping is determined based on, and the $$n_s^{\mu}$$

is the current slot number within a radio frame, the W is the length of the time domain window and $\lceil \rceil$ is a floor function.

10. The base station of claim 9, wherein a first frequency hop is an even-numbered hop, and a second frequency hop is an odd-numbered hop.

11. The base station of claim 9, wherein the starting RB during the slot $$n_s^{\mu}$$

for the PUSCH is determined based on the following equation,

[Equation]

$$RB_{start}(n_s^{\mu}) = \begin{cases} RB_{start} & \lfloor n_s^{\mu}/W \rfloor \bmod 2 = 0 \\ (RB_{start} + RB_{offset}) \bmod N_{BWP}^{size} & \lfloor n_s^{\mu}/W \rfloor \bmod 2 = 1 \end{cases}$$

where, $RB_{start}$ represents a starting RB within an uplink bandwidth part (UL BWP), $RB_{offset}$ represents a frequency offset in RBs between two frequency hops, $$N_{BWP}^{size}$$

represents a size of the UL BWP.

12. The base station of claim 9, wherein, within the time domain window, a phase and transmission power are maintained.

* * * * *